United States Patent [19]

Hauber

[11] 3,892,372
[45] July 1, 1975

[54] PNEUMATIC CARRIER SYSTEM WITH STATION CONTROL

[75] Inventor: Werner Hauber, Nutley, N.J.

[73] Assignee: The Mosler Safe Company, Hamilton, Ohio

[22] Filed: Aug. 30, 1973

[21] Appl. No.: 393,122

[52] U.S. Cl. .................... 243/5; 104/88; 243/16 R
[51] Int. Cl. ............................................. B65g 51/36
[58] Field of Search .......... 243/5, 16, 19, 2, 29, 38, 243/1; 104/88; 198/38; 340/163, 147 A

[56] References Cited
UNITED STATES PATENTS

| | | | |
|---|---|---|---|
| 3,302,113 | 1/1967 | Clay | 340/163 X |
| 3,410,501 | 11/1968 | Thorburn | 243/5 |
| 3,670,303 | 6/1972 | Dame | 340/163 X |
| 3,722,426 | 3/1973 | Beer | 104/88 |

*Primary Examiner*—Evon C. Blunk
*Assistant Examiner*—James L. Rowland
*Attorney, Agent, or Firm*—Wood, Herron & Evans

[57] ABSTRACT

A pneumatic carrier system for transmitting documents and the like between remote locations is disclosed. The system includes many remotely located stations each equipped with conventional pneumatic carrier dispatch and receive equipment. Each station also includes a selection console to permit the operator at such station to select the destination of the carrier loaded into the dispatcher. When the pneumatic system becomes available, the carrier is transmitted from the dispatching station to the receiving station selected by the operator. In modified form, the system may include two independent pneumatic loops with pneumatic interconnections permitting a station located on one loop to transmit a carrier to a station located on the other loop.

22 Claims, 17 Drawing Figures

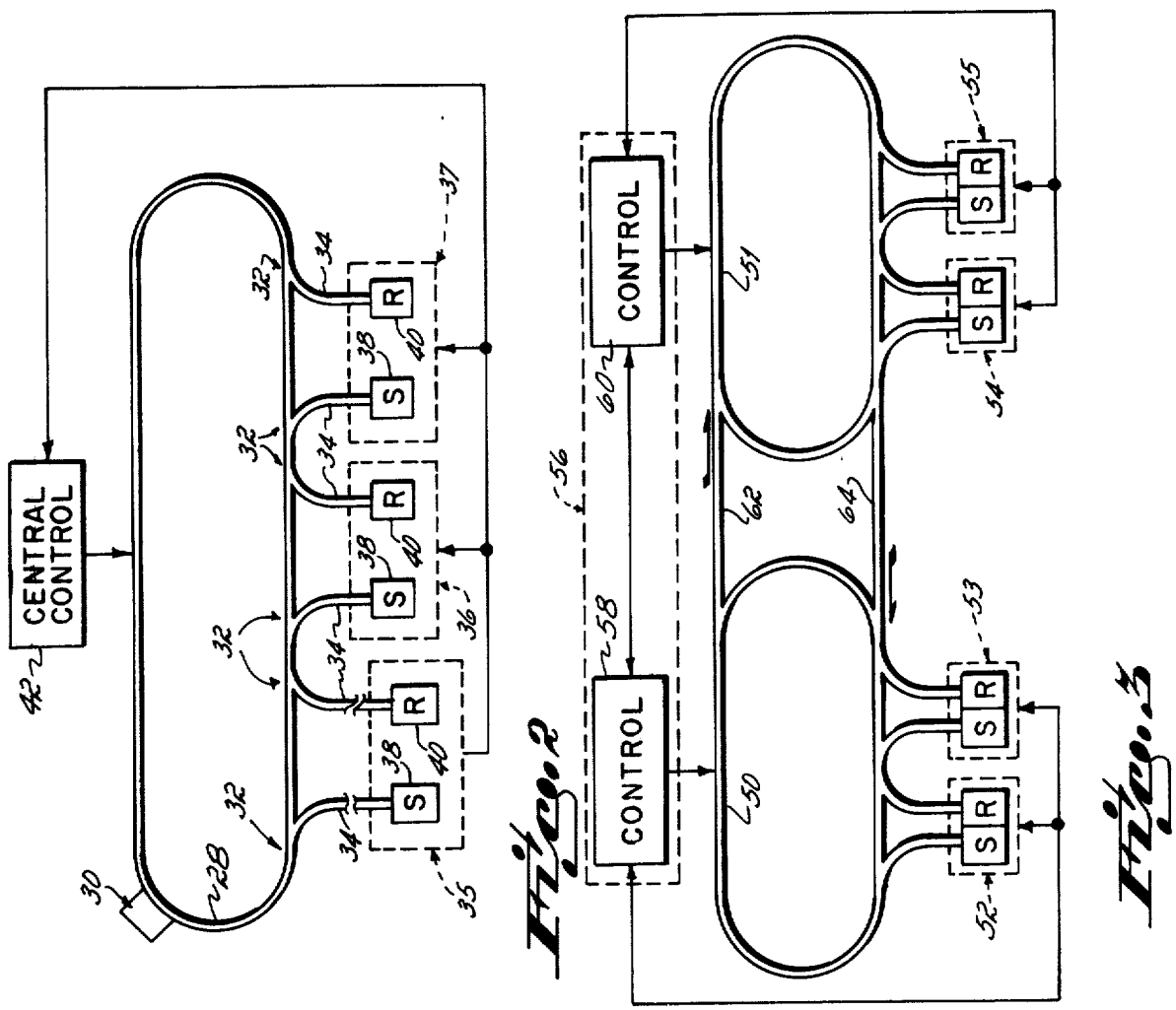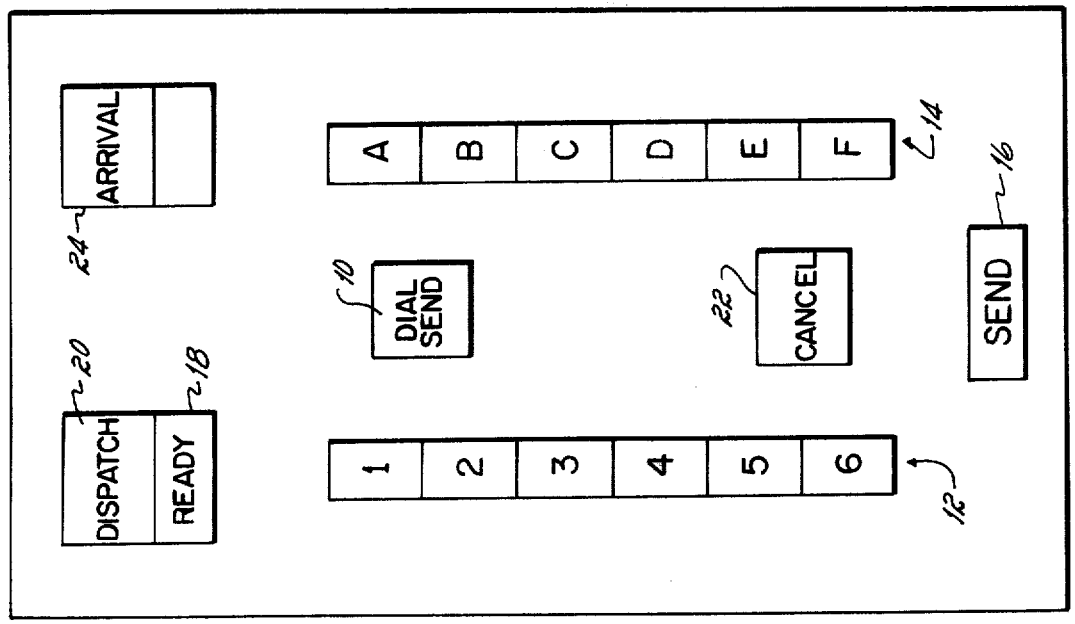

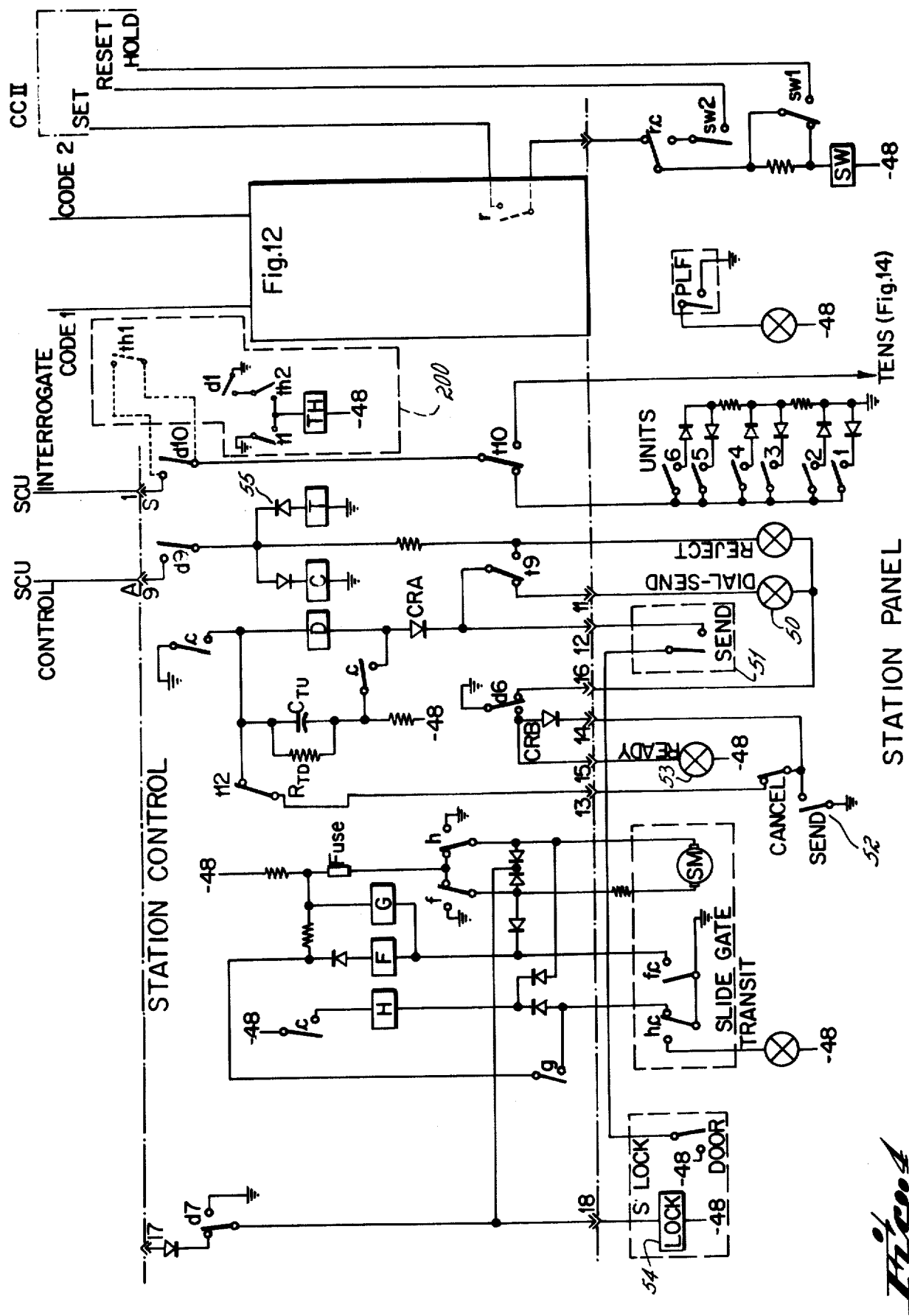

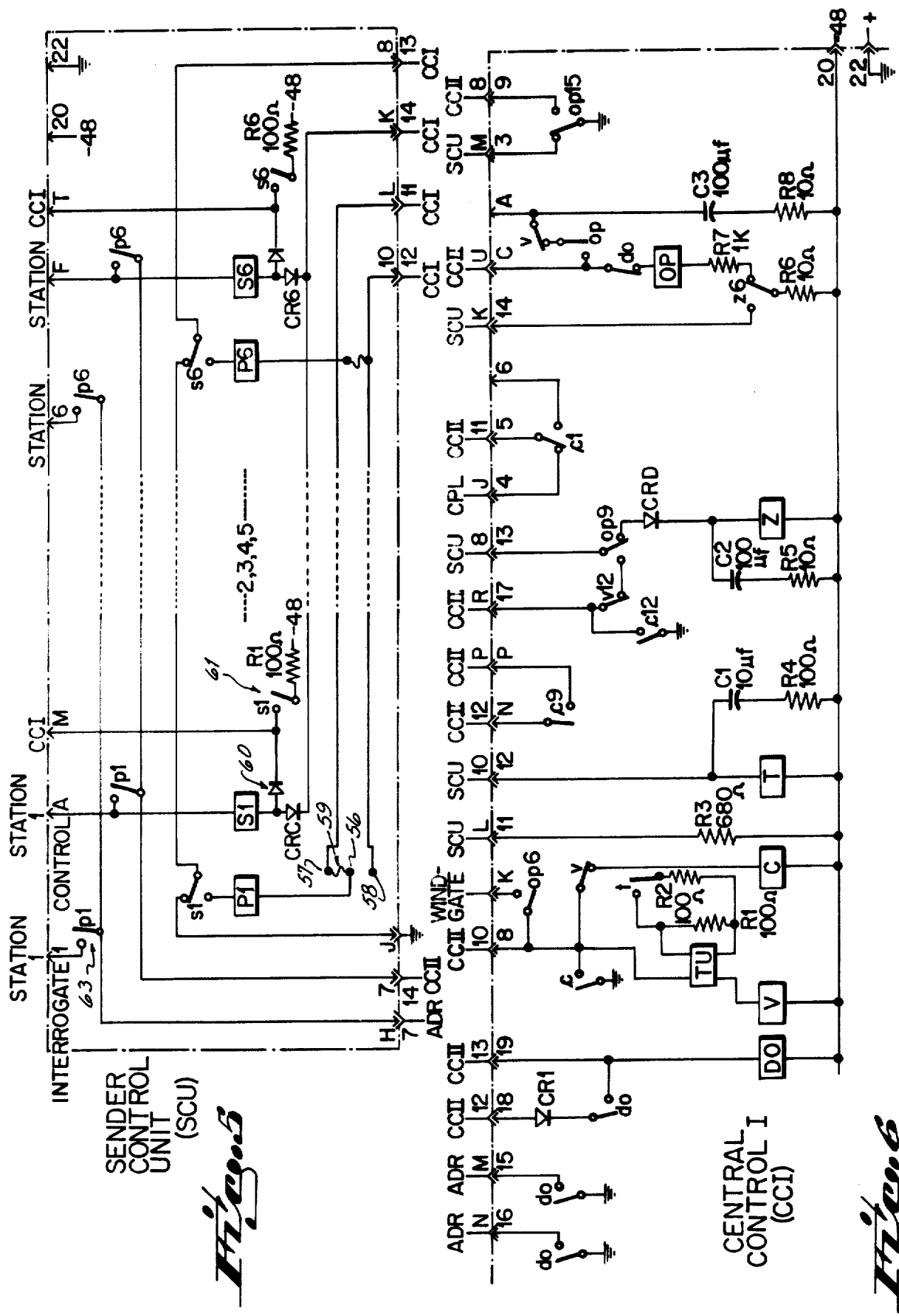

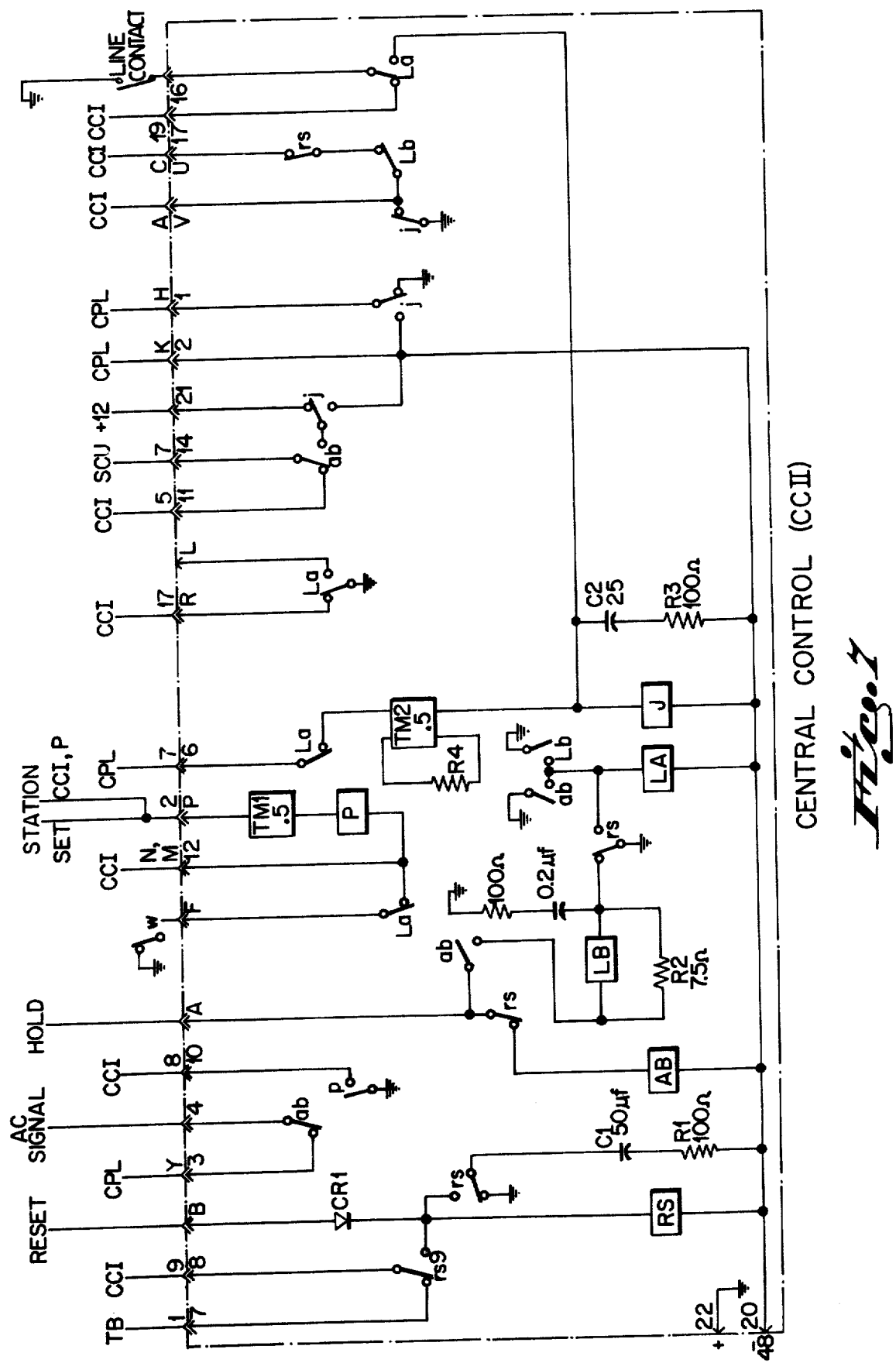

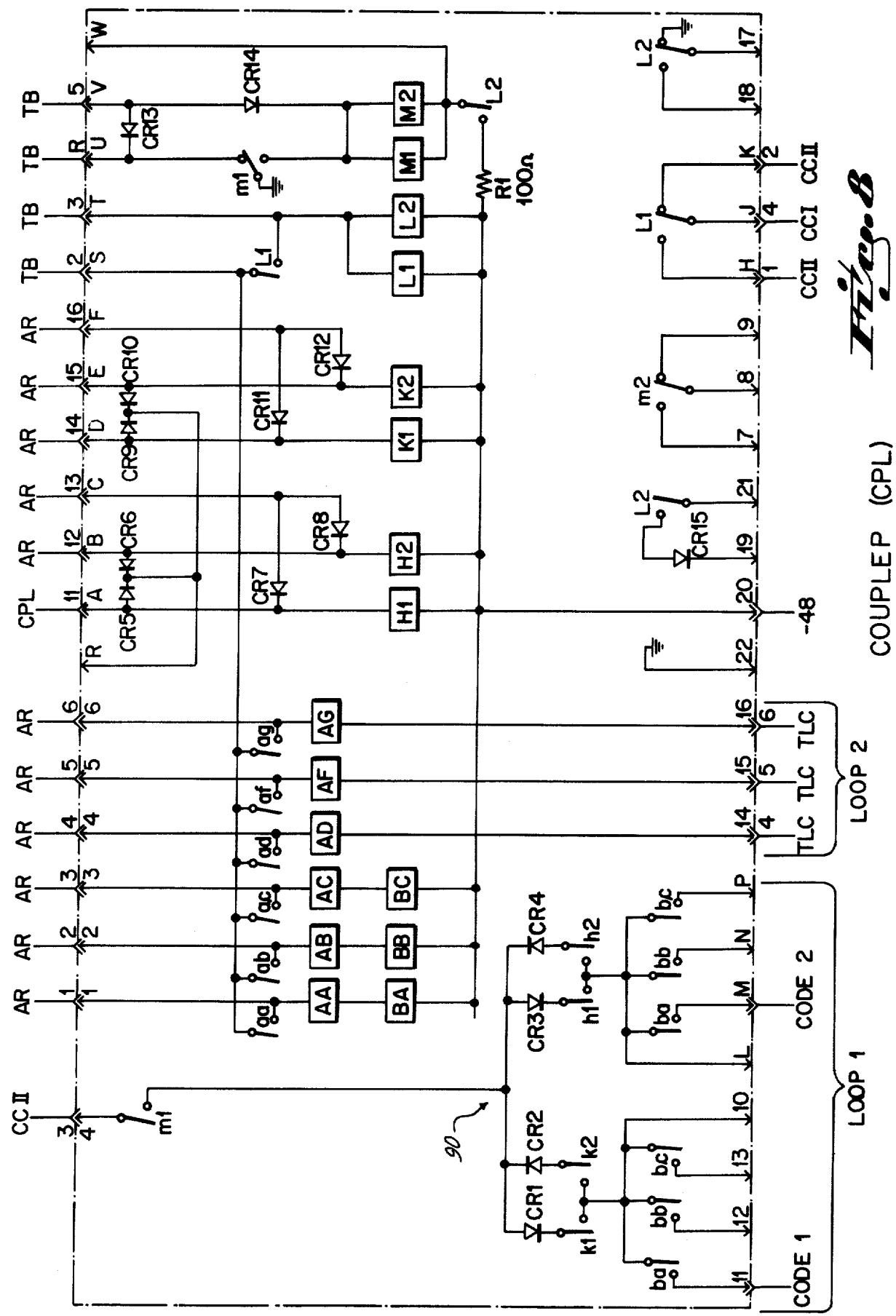

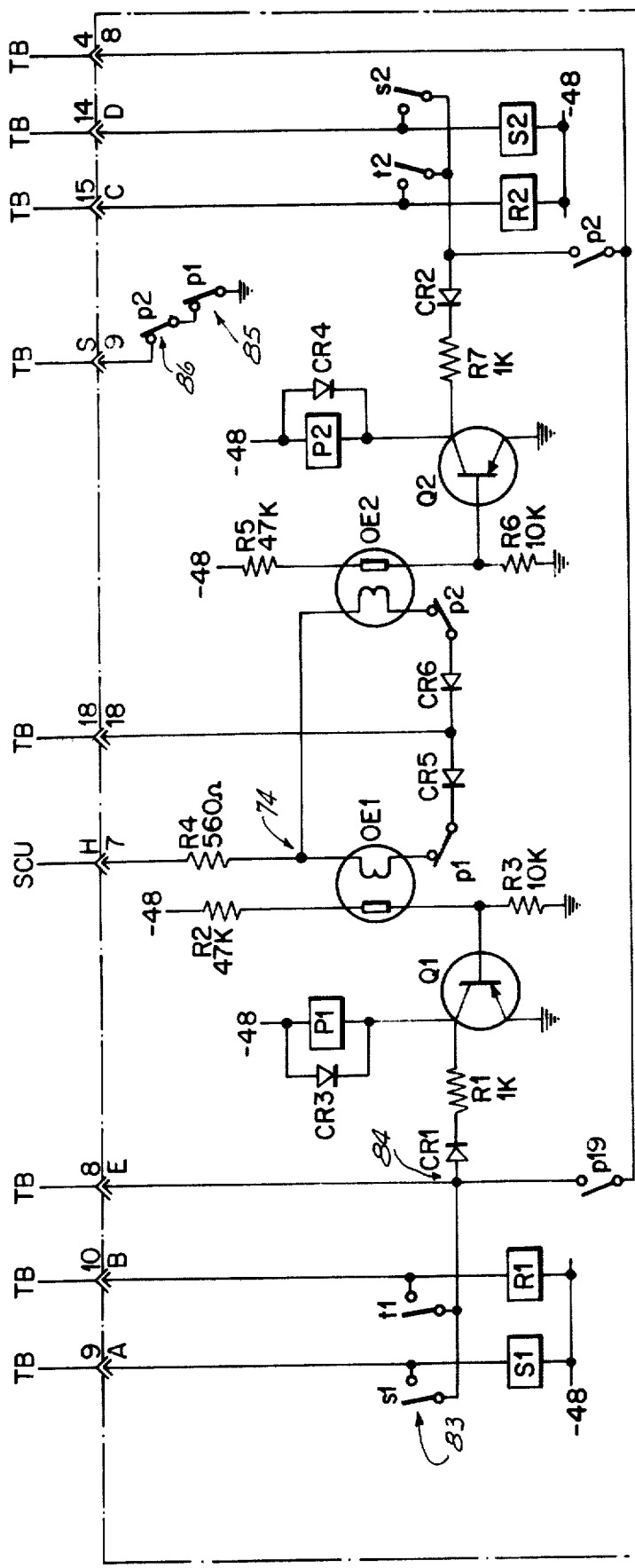
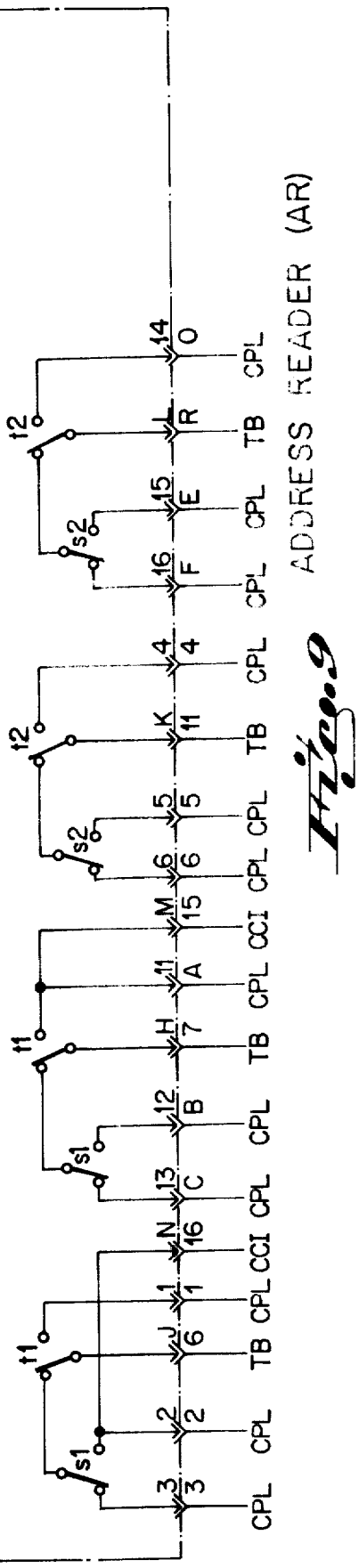
Fig. 9 ADDRESS READER (AR)

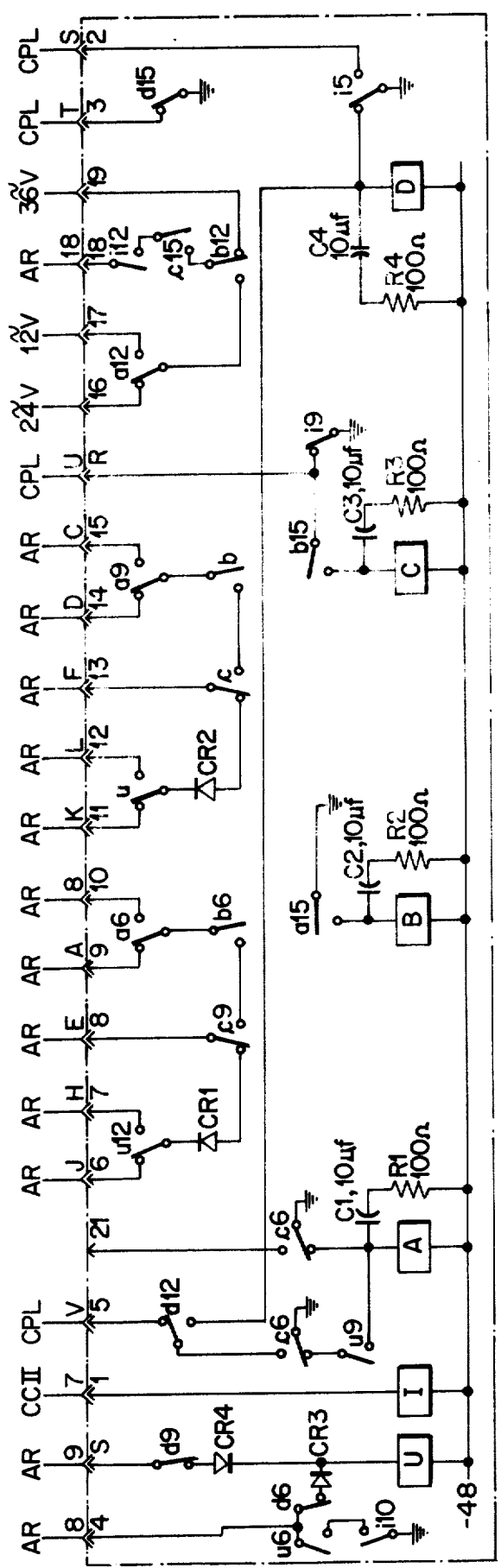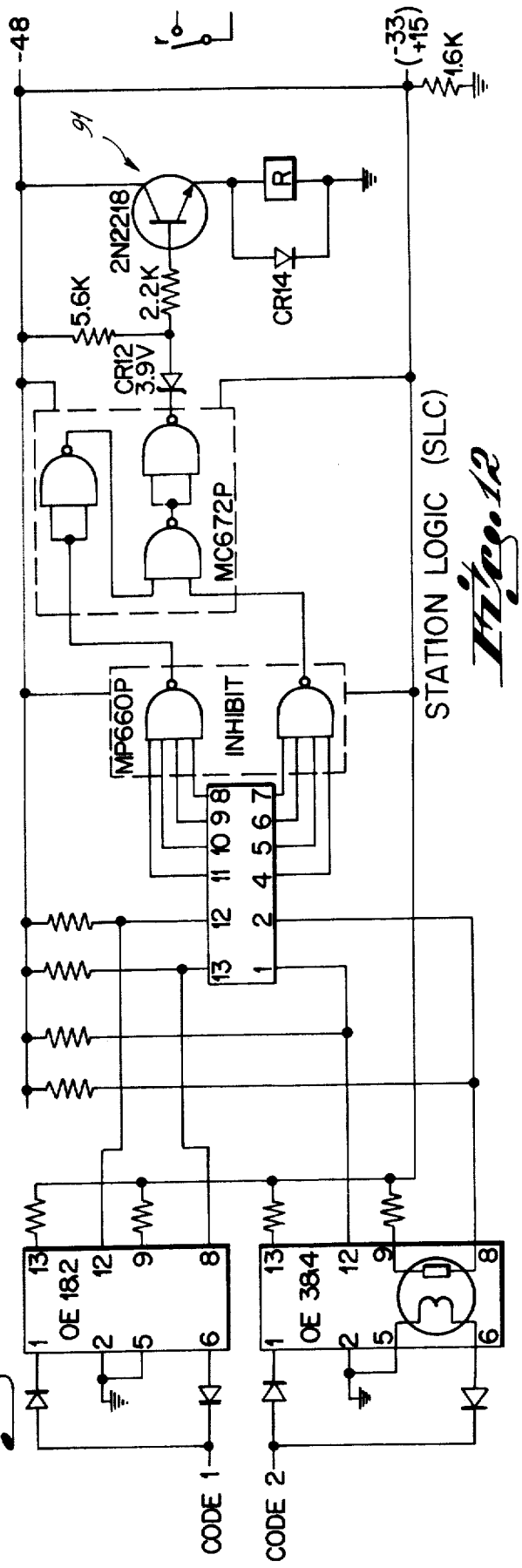

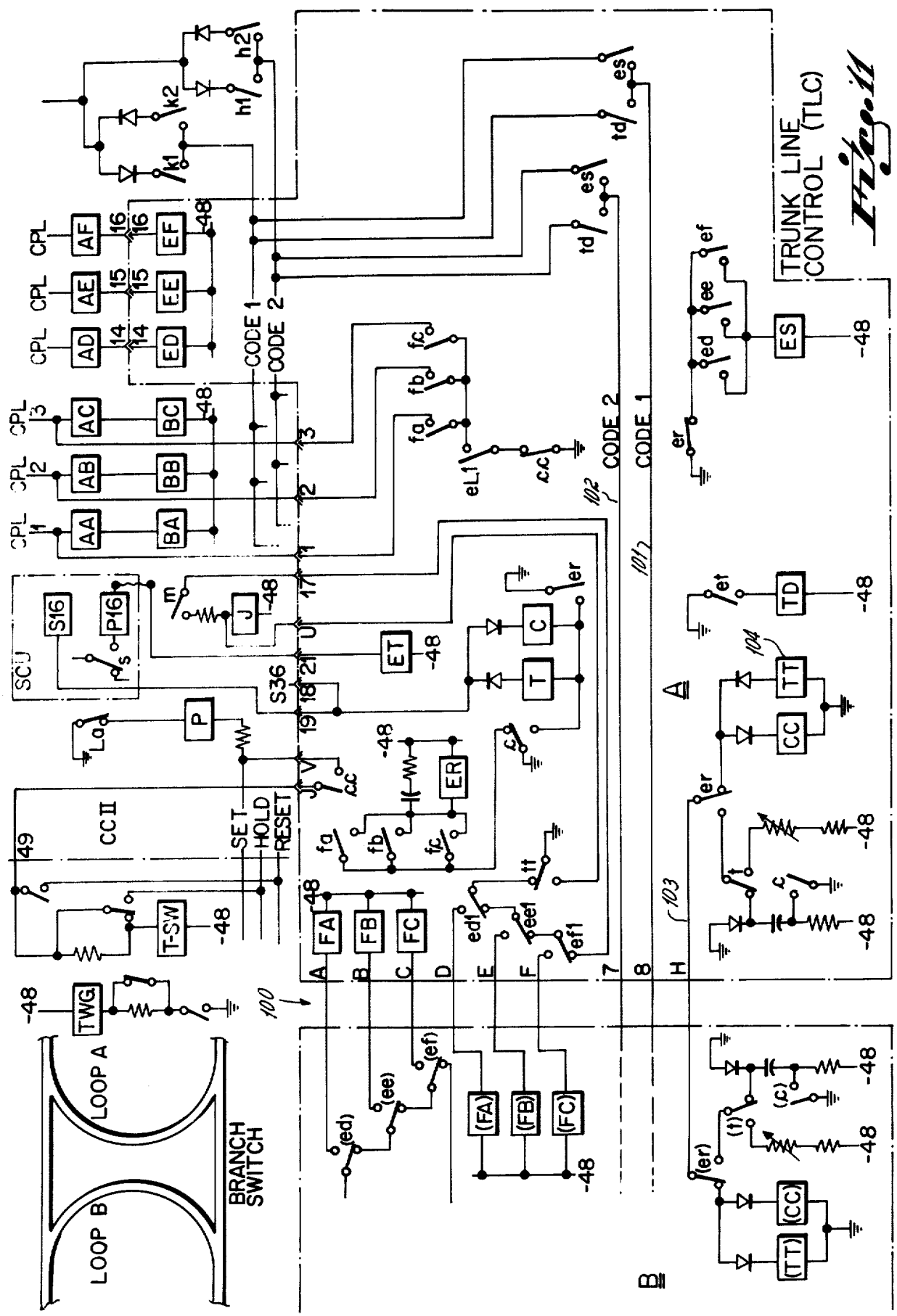

PNEUMATIC CARRIER SYSTEM WITH STATION CONTROL

BACKGROUND OF THE INVENTION

This invention relates generally to pneumatic carrier systems and specifically to a pneumatic carrier system for transmitting documents and the like in a carrier from one location to another location wherein the system includes a console at the dispatching station on which the operator selects the destination for the carrier.

In the past, numerous pneumatic dispatch systems have been developed to permit transmittal of documents or the like from one location to another within the system. Such prior art systems are frequently found within hospitals, department stores or the like and employ a long pneumatic loop in the form of a hollow tube. The operator wishing to dispatch a document to a remote location would place the document into a carrier, typically in the form of an elongated hollow cylindrical container, and mechanically adjust a destination selector such as a dial physically mounted on the carrier, so that the destination selected corresponds to the desired carrier destination. After the carrier destination is selected, the operator then inserts the carrier into the pneumatic loop through an appropriately located door 3 and the carrier is then transmitted through the pneumatic tube system by air pressure and/or vacuum to the desired destination.

Other prior art systems include electrical dialing units at each sender station. Once the pneumatic carrier is loaded in the sender, the operator then dials the carrier destination. The sender of such systems transmits the dialed destination to a system central control which will then activate the pneumatic controls to transmit the carrier to the dialed destination.

Systems of the type described above, however, do have a number of deficiencies. In the first place, operators of some such systems are required to adjust a station selector on the carrier prior to inserting the carrier into the pneumatic system. Due to the very nature of pneumatic systems, however, the carriers frequently are quite dirty and the operator is required to unnecessarily handle the carrier when selecting the destination address. Consequently, operation of such a system frequently gives rise to employee complaints because their hands become dirty from unnecessary contact with the carriers.

A further deficiency of some prior art systems is that the carrier itself contains the indication of its destination. As such, the carrier destination must be read from the carrier itself as it is transmitted through the system. Such systems which have been adapted to reading the destination indicator on the carrier itself have proved to be undesirable because of the inherent difficulties in reading the carrier-borne destination indication. One approach has been to read the destination from a moving carrier. This approach is undesirable because reading the destination from a moving carrier requires a rapidly operating reader which, if accurate, is very expensive. Other approaches have actually stopped the carrier and read the destination from the stopped carrier. This approach requires carrier stopping equipment as well as reading equipment. As such, this approach is also expensive and, further, increases the system carrier transmission time from the sender to the receiver station.

Prior art pneumatic tube systems have also proved to be inefficient because these systems usually are designed with a single long loop of pneumatic tubing. When a carrier is transmitted from one station to another, the carrier may have to travel through nearly the whole length of the pneumatic tube before reaching the destination. Consequently, the transmission time of a carrier from one station to another is very long.

A modified form of such prior art pneumatic carrier systems includes a single loop with a shunt path to reduce the distance traveled by a carrier by shunting the carrier directly to the portion of the pneumatic loop when the carrier is being sent. Such a modified system is advantageous as compared to a large single loop system because the distance traveled by a carrier is reduced by shunting the carrier around the portion of the pneumatic loop where destination is located. The difficulty with such systems, on the other hand, is that operation of such modified systems is the same as those outlined above. Furthermore, the controls for the shunting of carriers from one part of the pneumatic loop to another are numerous and costly and generally are not justified from a cost/performance analysis because the cost is so large compared to the small performance increase.

In addition to the foregoing difficulties associated with prior art pneumatic tube systems, the design of these systems necessitates installation of a large number of electrical interconnection wires between the various control elements, stations, etc. As such, installation of prior art systems of the type described has become very costly in recent years due to very high labor costs. Indeed, labor costs frequently are as much as 50% of the overall cost of a pneumatic carrier system.

Some prior art systems have had controls at each station to permit the operator to select on a console at the station the destination of the carrier ready to be dispatched from the station. These systems usually include a destination address sender unit at each station to transmit to the system central control a coded signal for indicating the carrier destination. The coded signal is usually in the form of a pulse coded message, a tone coded message or other forms of coding. Consequently, each station must include a fairly complex coder to generate the destination address code and the central control must include circuitry to utilize the destination information received from the station. The cost of such coders and receiver circuitry for determining the destination selected at the station is very high making these systems less competitive with alternative pneumatic systems or alternate approaches.

In view of the foregoing difficulties and problems associated with prior art pneumatic carrier systems, it is a primary objective of this invention to provide a pneumatic carrier system with high reliability and low manufacturing and installation costs.

It is still a further objective of this invention to provide a pneumatic carrier system for transmitting carriers between remote locations wherein the carrier destination is selected on a station located console without requiring the operator to handle the carrier itself to select the carrier destination.

It is yet a further objective of this invention to provide a station controlled pneumatic carrier system utilizing as few electrical conductors as possible between each station and the central control.

It is still a further objective of the invention to provide a station controlled pneumatic carrier system wherein the station destination selection logic is inexpensive and uncomplicated and the central control includes an interrogation circuit for determining the destination selected at the station without requiring the station itself to transmit to the central control a coded signal containing the destination address.

It is another objective of this invention to provide a station controlled pneumatic carrier system having two independent pneumatic loops permitting pneumatic transfer of carriers within each loop simultaneously and also transfer of carriers from one loop to another without significantly degrading performance of each loop.

BRIEF DESCRIPTION

The foregoing objectives of this invention are achieved generally by a pneumatic carrier system including at least one pneumatic loop. A number of remotely located stations are connected to the pneumatic loop by pneumatic connecting tubes known as snorkels. Each station additionally includes a selection console on which the operator dials or selects the destination desired for the carrier which has been loaded in the pneumatic dispatcher. When the central control determines that the pneumatic loop is available to accept a carrier from a given station, the carrier is dispatched from the sending station by this central control to the receiving station. Upon arrival of the carrier at the receiving station, the central control is notified and the pneumatic system is reset to permit transfer of another carrier from another sending station. The electrical controls for this system includes a number of electrical wires which are used at various times in the electrical control sequence to transmit different signals between the central control and the sending or receiving station. By utilizing single wires to transmit multiple messages, the number of electrical cables between the stations and the central control are reduced thereby reducing actual cable costs as well as installation costs.

In modified form, the present invention includes two independent loops of the same type as generally described above. There are pneumatic connector tubes between the loops which are activated only when a carrier is transferred from one loop to another. Under other circumstances, each of the loops is controlled independently thereby permitting simultaneous transfer of a carrier within each loop. Furthermore, operation of the transfer mechanism between the two loops is identical as far as each central controller is concerned to transferring a carrier from one station to another within the loop. As such, carrier transfer from one loop to another is not complex and the performance of each loop is not significantly degraded.

The foregoing and other objects, advantages, and features of this invention will become more clear from the following detailed description taken in connection with the drawings which form a part of the original disclosure.

DESCRIPTION OF THE DRAWINGS

FIG. 1 shows the console at each station.

FIG. 2 shows schematically a multi-station single loop pneumatic carrier system with a central control responsive to requests from individual stations on the loop.

FIG. 3 shows schematically two independent pneumatic carrier loops with a central control and pneumatic tubes joining the two loops to permit carriers to be sent from a station on one loop to a station on the other loop.

FIG. 4 shows a schematic diagram of the electrical elements at each station.

FIG. 5 shows a schematic diagram of the electronics for the sender control unit (SCU) which forms part of the central control.

FIG. 6 shows a schematic diagram of the electronics for part of the central control known as Central Control I (CCI).

FIG. 7 shows a schematic diagram of the electronics for part of the central control known as Central Control II (CCII).

FIG. 8 shows a schematic diagram of the electronics for the Coupler (CPL).

FIG. 9 shows a schematic diagram of the electronics for the Address Reader (AR).

FIG. 10 shows a schematic diagram of the electronics for the Time Base (TB).

FIG. 11 shows a schematic diagram of the electronics for the Trunk Line Control (TLC).

FIG. 12 shows a schematic diagram of the electronics at each receiver for determining if the central control is calling a particular receiver.

GENERAL DESCRIPTION

Figure 13:
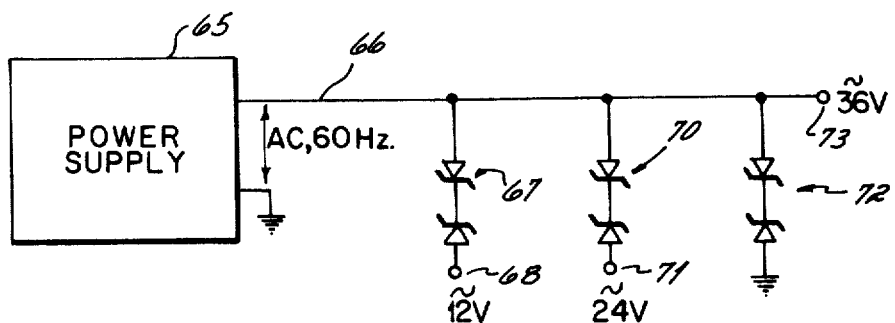
FIG. 13 shows the electronics for developing the signals used by the Address Reader for interrogating the address switches at each station.

Referring now to FIG. 1, a typical dispatch console is shown. Such a console is located at each station in the pneumatic carrier system of the present invention. Located adjacent this station console is a typical pneumatic dispatcher or sender for inserting carriers into a pneumatic system and a receiver for receiving carriers from a pneumatic system. Both the dispatcher and the receiver are conventional in pneumatic systems currently in use and do not form a part of this invention. The dispatcher itself usually includes a door or other opening through which the operator can insert a carrier into the dispatcher or sender. When the dispatcher door is closed after a carrier is inserted therein, a switch is closed to thereby turn on the Dial/Send light 10 on the console. This will indicate to the operator that a destination for the carrier should be selected by depressing a numbered button in the column of buttons 12 and also depressing a lettered button in the column of buttons 14. The number and letter selected by the operator corresponds to the address assigned to the location to which the carrier is to be sent. After the destination has been selected, the operator then depresses the send button 16 which will provide an electrical signal for indicating to the central control that the station is ready to dispatch a carrier to the pneumatic loop for transmission to another station. Upon depressing the send button 16, the Ready Light 18 will be turned on indicating that the station is ready to dispatch the carrier to the pneumatic loop and the sender door becomes locked to prevent removal of the carrier.

The central control responds to the signal from the station indicating that a carrier is ready to be sent by first determining the destination of the carrier. After the carrier destination is determined by an interrogation process (described later), the central control then determines if the destination station is available. If it is unavailable, a reject signal is sent to the station causing the cancel light associated with the cancel button to be turned on. If the destination station is available, however, the central control will operate the station deflector to deflect carriers from the pneumatic loop through the snorkel to the destination station. After this is complete, the central control turns on the Dispatch light 20 and operates the station slide gate permitting the carrier to be released into the snorkel and transmitted through the pneumatic loop to the destination.

The console shown in FIG. 1 also includes a cancel button 22 which may be operated by the operator to cancel a station request to the central control to transmit a carrier in the sender mechanism. The cancel button 22, when depressed, will permit the operator to remove a carrier from the dispatch mechanism subsequent to its insertion and the sender door becoming locked by a depression of the send button 16. The cancel button 22 is operative to cancel a request for dispatching a carrier to the central control at any time between the depression of the send button and receipt by the station of a dispatched signal from the central control.

The station console shown in FIG. 1 also includes an arrival lamp 24 which becomes lighted whenever a carrier is transmitted from another station to the carrier receiving mechanism associated with the console. The arrival lamp 24 thereby provides an easily observed indication to each station operator that a carrier has been transmitted to his station from some other location in the system thereby preventing the necessity of looking in the carrier receiver mechanism itself.

Referring now to FIG. 2, a schematic system diagram is shown for a single loop pneumatic carrier system. In this system there is a long pneumatic loop 28 which has an air control and wind gate module shown generally at 30 for controlling the movement of carriers throughout the system. The air control and wind gate module 30 is of the type well known in the art and need not be described here in greater detail. The pneumatic loop 28 itself typically comprises a metal or plastic tube forming a complete loop through which carriers of the conventional type move freely under control of the air and wind gate control module 30. Disposed at random locations along the loop 28 are snorkel connections shown generally at 32. These snorkel connections comprise conventional carrier deflectors or switches for deflecting a pneumatic carrier from the loop 28 to one of the snorkels 34 which pneumatically connect the loop 28 with the receive mechanisms located at the stations 35, 36, and 37. The snorkels connecting a sender S with the loop 28 are joined to the loop with a standard "Y" branch which allows a carrier to freely pass from the snorkel to the loop 28.

As indicated generally above, each station includes a sender 38 and a receiver 40. Both the sender 38 and the receiver 40 comprise conventional pneumatic mechanisms currently utilized in pneumatic carrier systems. The dispatcher mechanism 38 is operative in combination with a station console such as shown in FIG. 1 to permit the operator to dispatch a pneumatic carrier from any one station and have that carrier delivered automatically under supervision of the central controller 42 to any receiver mechanism in the system. The station operator performs the operations described in connection with the station console shown in FIG. 1. Once the destination address has been dialed and the send button depressed, the central control 42 is operative to control the pneumatic switches and the like to control the system to transmit a carrier from the sender 38 of a given station to the receiver 40 of another station. Specifically, a station operator at station 35 would place a carrier into the sender 38 at station 35. Once the destination had been dialed and the send button depressed, the central control 42 will respond to the request for service by station 35 by first interrogating the destination station switches at station 35. Then, the central control 42 will determine if the destination station is available. If so, then the deflector to the snorkel of the destination station is switched. The station 35 is then notified that the carrier should be dispatched. The dispatch signal from the central control 42 is operative to open the slide gate (a motor driven plate that opens and closes the send compartment) at the sender 38 of station 35 permitting the carrier to enter the loop 28. Assuming that station 36 was the desired destination for the carrier loaded in the sender 38 at station 35, the central control 42 will activate the deflector 32 associated with the snorkel 34 and receiver mechanism 40 of station 36 to receive a carrier. Then the central control 42 dispatches the carrier from station 35 through the snorkel 34 from the sender 38 at station 35 to the loop 28. The slide gate of station 35 closes after a fixed time satisfactory to deliver the carrier from the station into the main loop. The carrier moves in a direction toward the air and wind gate control module 30 and then on around the loop until reaching the intersection of the loop 28 and the snorkel 34 associated with the receiver 40 at station 36. Then the carrier would be diverted into that snorkel 34 by the deflector 32 and eventually come to rest at the receiving mechanism 40 at station 36. Upon arrival at station 36, an arrival signal is transmitted to the central control 42 which indicates the carrier has arrived at the receiver 40 and the loop 28 may now be conditioned for transmitting another carrier in response to the dispatch request of any station on the loop.

From FIG. 2 it is clear that the snorkels 34 may have differing lengths. This system capability is highly desirable because in buildings such as hospitals and department stores utilizing pneumatic carrier systems, it is not always feasible to locate the main loop of the pneumatic system exactly the same distance from each of the stations disposed around the loop. Consequently, snorkels of varying lengths are generally necessary. Because these snorkels are of varying lengths, precautions must be taken in the control of the deflectors 32 and slide gates to insure that the carriers have entered or left the snorkel before the positioning thereof is changed. These timing complications, however, are easily solved in a manner well known in the pneumatic carrier system art.

Referring now to FIG. 3, a dual loop pneumatic carrier system is shown in schematic form. The system includes two substantially identical pneumatic loops 50 and 51, with stations 52 and 53 located on loop 50 and stations 54 and 55 located on loop 51. Each station includes a sender and receiver connected by a snorkel to one of the pneumatic loops in the same manner as described in connection with FIG. 2. While each of the loops 50 and 51 are shown with only two stations disposed around each such loop, in accordance with the apparatus described later in greater detail, the present system in its preferred form is capable of including up to 18 stations on each of the two loops 50 and 51 and may be expanded to include more stations by simple modification of the system.

The dual loop system of FIG. 3 includes a central control 56 which actually comprises two controllers 58 and 60 associated with the pneumatic loops 50 and 51 respectively. The controllers 58 and 60 also have electrical connections therebetween which are operative when a carrier is being transmitted from one loop to the other via either loop interconnection tube 62 or 64.

Since there are two controllers 58 and 60 each operative to independently control the operations of each pneumatic loop 50 and 51 respectively, each of these two loops 50 and 51 are independent and a single carrier may be moving within each loop at the same moment in time. However, when the operator at station 53, for example, desires to send a carrier to station 54, the carrier must be transmitted from loop 50 to 51 via the interconnection tube 62. When such an interconnection is desired between the loop 50 and the loop 51, the controller 58 must communicate with the controller 60 and their respective operations be synchronized. This synchronization is advantageously achieved in the following manner. As far as controller 58 and loop 50 are concerned, the operation of transferring a carrier from loop 50 to loop 51 appears identical to the operation of transmitting a carrier from a station on loop 50 to the receive snorkel also on loop 50. However, the receive snorkel in this case corresponds to the interconnection tube 62. As such, controller 58 must operate the deflector along loop 50 which diverts a carrier from loop 50 into the interconnection tube 62. On the other hand, the controller 60 responds to the request from controller 58 just as if it was receiving a request from a station located on loop 51. As such, as far as controller 60 is concerned, the movement of the carrier in the interconnection tube 62 appears identical to the movement of the carrier down the dispatch snorkel from a station disposed on loop 51. In response to a request from controller 58 to transmit a carrier from loop 50 to loop 51 the controller 60 responds in a manner identical to that described in connection with FIG. 2 thereby directing the carrier to the destination which is station 54 for the example selected. As soon as the carrier has entered the interconnection tube 62, it operates a signal contact that resets the control 58 and returns loop 50 to its normal operation. Once the carrier is received at the receiving station 54, the arrival signal is transmitted back to controller 60 which is operative to reset controller 60 to a condition permitting any station associated with control loop 51 to subsequently request service. As such, the circuit shown in FIG. 3 is capable of moving two carriers simultaneously, one carrier being moved within each of the two loops 50 and 51. However, when a carrier is transmitted from one loop to the other loop, each loop must become free because both loops are necessarily occupied when a carrier is transmitted from one loop to another.

DETAILED DESCRIPTION

The foregoing discussion has been directed generally to the overall mode of operation for systems characterizing this invention. The particular objects, advantages and features of this invention, however, can be more easily understood through a detailed description of the electrical control circuitry for the system. This objective is best achieved by describing the operation of the circuits shown in FIGS. 4–15 which show in detail a preferred embodiment of this invention. Each of these circuit diagrams are drawn utilizing standard symbols which will be readily understood by those of skill in the art.

Figure 16:
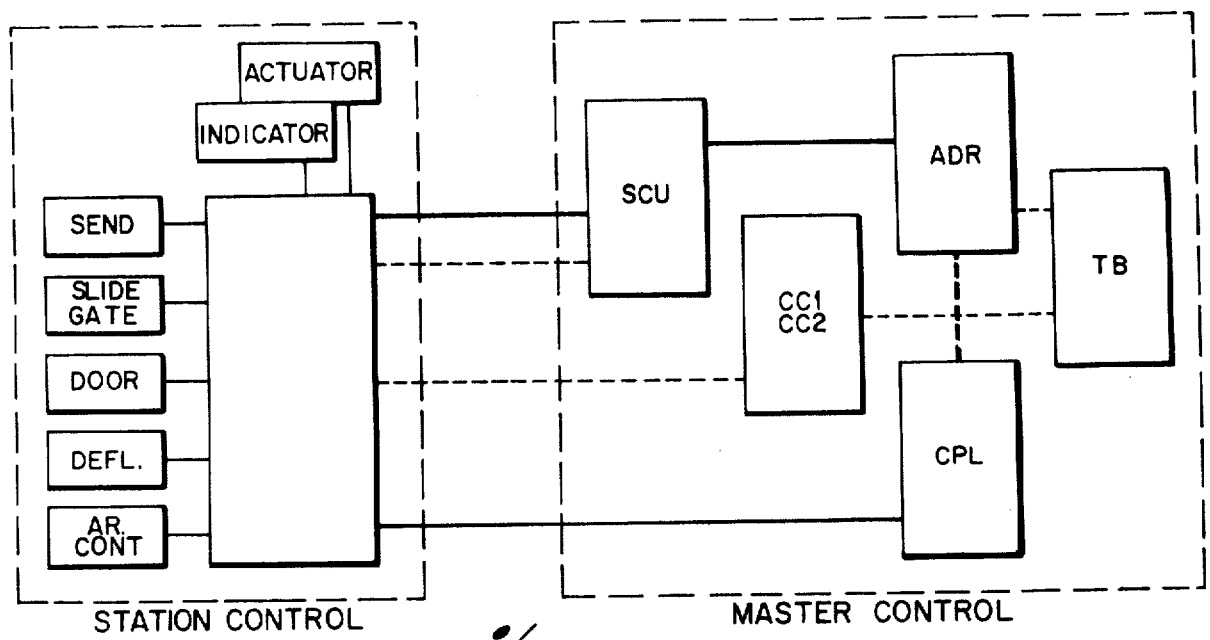
FIG. 16 shows schematically the system control elements and the manner in which they generally are interconnected.

The circuits shown in FIGS. 4–10 and 12 are generally interconnected in a manner shown in FIG. 16. The detailed operation, however, of the system of FIG. 16 is discussed only in connection with the detailed description of the other figures.

When a station operator inserts a carrier into the sender apparatus, upon closing the sender door, the sender contact and the door contact become closed to thereby turn on the dial/send light on the station console. This circuit is shown in FIG. 4 wherein a ground connection is established from ground potential through the relay contact d6 (positioned as shown) to the Dial-Send lamp 50. From the Dial-Send lamp 50, a connection is formed via relay contact t9 (positioned as shown), to the send contact shown within dotted line 51 which becomes closed upon closing of the door to the sender apparatus. From the sender contact, the electrical connection passes through the closed door contact to a minus 48 volt potential. As such, current flows from the —48 volt supply through the dial/send light 50 to ground. As indicated generally above, once the operator sees that the dial/send light 50 is illuminated, he then will select a destination for the carrier by depressing one of the units and one of the tens buttons on the station console. These switches preferably mechanically latch until another button in the same group is depressed. After the address has been dialed by depressing one button in each group, then the operator presses the send button 50 on the station console.

Depressing the send button 52 is operative to energize the D relay. This circuit is completed in the following manner. When the send button 52 is depressed, a ground connection is formed with one of the cancel button contacts. The cancel button provides a short circuit therethrough to the relay contact t12 (positioned as shown). From the relay contacts t12, the electrical connection continues through the relay coil D, through the diode CRA to a —48 volt potential. As such, an electrical circuit is completed to energize the D relay coil.

When the D relay becomes energized, the Dial-Send light 50 is turned off because the d6 relay contact removes the ground potential applied to one side of the Dial-Send light 50 thereby causing this lamp to become extinguished. The changing of the d6 relay contacts, however, applies a ground potential to the Ready light 53. The other contact of the Ready light 53 is connected to a —48 volt potential, and therefore, the ready light will become ignited. Additionally, the D relay becomes latched through a latching circuit utilizing relay contact d6. This latching circuit applies a ground from relay contact d6 through the diode CRB to the Cancel switch. From the Cancel switch, the latch circuit continues through the relay contact t12 to the D relay coil. From the D relay coil, the circuit is completed through the diode CRA, the sender contact 51 and the door contact to a −48 volt potential. As such, even when the send button 52 is released by the operator, the D relay will remain energized.

When the D relay becomes energized, the sender door becomes locked. This locking circuit is provided via the d7 relay contact which provides a ground connection to the sender lock relay coil 54 to the −48 volt potential connected on the other relay coil 54 lead. As such, whenever the D relay is energized, the sender door is locked to prevent the operator from inserting another carrier into the sender until the carrier has been dispatched or the D relay coil de-energized.

Upon energizing the D relay, a signal is transmitted to the Sender Control Unit (SCU) indicating that the station has a carrier loaded in the sender and ready to be dispatched. In effect, the D relay comprises a signaling means at each station which, when energized, becomes active to signal the central control that a station is ready to dispatch a carrier. Energizing the D relay provides a connection from ground to the T relay coil. From the T relay, the electrical connection continues through a diode 55 to the closed d9 relay contact (positioned not as shown) and then onto the connector pin 9. Connector pin 9 is connected via the control wire to a connector pin A at the Sender Control Unit (SCU) shown in FIG. 5. It should be noted at this point, however, that connector pin 9 at the station shown in FIG. 4 is connected to connector pin A for the Sender Control Unit in FIG. 5 when the station control shown in FIG. 1 corresponds to the control for station number 1. When the station number is different, however, pin 9 of the station will be connected to other connector pins such as B-F of the Sender Control Unit shown in FIG. 5 thereby permitting each sender control unit to control more than one station. It will be clear to those of skill in the art that additional stations can be connected into the sender control unit to permit control of more stations than shown by adding additional and similar controls to the sender control unit.

Referring now to FIG. 5, the circuit continues from the connector pin A through the relay coil S1, through the diode CRC and onto the connector pin K. From the connector pin K on the Sender Control Unit, the connection continues to pin 14 of the Central Control Unit circuit board No. 1 (CCI) FIG. 6. The electrical connection then passes through the z6 relay contact which is conditioned to the position not shown in FIG. 6 because the Z relay coil has current conducting therethrough whenever the electrical circuit shown in FIGS. 4-12 is in a rest state. From the relay contact z6, the circuit is completed through the resistor R6 to a −48 volt potential. As such, an electrical connection is established through relay coils T and S1. The current passing through this conductive path, however, is specifically controlled by the resistor R6 to provide a sufficient current to cause the S1 relay to become energized but insufficient current to energize the T relay at the station.

When the pneumatic system does not have a carrier being transmitted, the circuit for energizing the Z relay comprises an electrical connection of one Z relay coil lead to a −48 volt potential as viewed in FIG. 6. The other Z relay coil lead is connected to the diode CRD and then on through the op9 relay contacts to the CCI pin 13. This pin 13 is connected to pin A of the SCU which passes through the series connected s1-s6 relay contacts which provide a ground connection via pin J. When the relay coil S1 becomes energized, however, the ground connection is removed from the Z relay coil thereby removing the power for the Z relay. The Z relay, however, remains energized for approximately 100 microseconds because the coil itself is shunted by the capacitor C2 and the resistor R5 which serve to provide a time delay for de-energizing the Z relay.

When the Z relay (FIG. 6) releases, the z6 contact changes to the position shown thereby applying a −48 volt potential through the resistor R6, the relay contact z6, the resistor R7 to one OP relay coil lead. The other OP relay coil lead is connected through the do relay contact, the rs relay contact, the 1b relay contact, the j relay contact to ground. As such, the OP relay becomes energized. In addition, no other S relays (FIG. 5) can close until the Z relay becomes energized again because the z6 relay contact prevents applying −48 volt supply to other S relay coils.

When the OP relay becomes energized, the P1 relay (FIG. 5) may also become energized. The P1 relay coil has one coil lead connected to a pin 56. Two other pins 57 and 58 are shown which are connected via a jumper wire shown generally as 59 to connect pin 56 with either pin 57 or pin 58. Pin 57 is connected to pin 56 by a jumper 59 whenever station 1 includes a long snorkel between the station and the main pneumatic loop. On the other hand, when station 1 corresponds to a station having a short snorkel, the pin 56 is connected by a jumper 59 to the pin 58. Pin 57 is electrically connected to the SCU pin L which connects to pin 11 on the CCI circuit board. From this pin 11, a circuit is completed through the resistor R3 to the −48 volt supply. The other P1 relay coil lead is connected via relay contact op9 and relay contact La to ground. As such, an electrical connection is provided for energizing the P1 relay.

In a similar manner, if the jumper 59 connects pin 56 with pin 58, an electrical circuit is completed through the T relay in FIG. 6 to the −48 volt supply. The purpose of this T relay is to provide a short duration signal for controlling the slide gate associated with a station having a short snorkel. This is accomplished, as will become more clear later, by controlling the length of time that the P1 relay conducts in the SCU thereby controlling the time that the +12 volt signal is applied to the C relay at the station. The time of the +12 volt signal being applied to the C relay at the station controls the time period that the slide gate is opened. If the jumper 59 in FIG. 5 connects pins 56 and 58, the conduction time for the P1 relay is less than if the pins 56 and 59 were connected. Consequently, the first connection is used for stations with short snorkels and the latter for stations with long snorkels.

It is clear, however, that only one of the P relays in FIG. 5 can be energized at any one time because the S switch contacts are operative to switch the ground potential from pin 8 of the SCU to only one of the P relays. Since it is assumed that only one of the S relays is conducting for the example under current consideration, all of the S relays except S1 are turned off thereby permitting the ground connection from pin 8 of the SCU to be connected via relay contact s1 to the relay coil P1.

It should also be noted that the relay S1 remains energized after the Z relay is de-energized by an electrical connection formed through the diode 60, through the closed relay contacts 61 and through the resistor R1 to the −48 volt supply.

When P1 relay becomes energized, the p1 relay contacts close to thereby connect the control wire via connector pin A of the SCU to the ab relay contact, the c1 relay contact and the L1 relay contact to −48 volts. Therefore, closure of relay P1 places a −48 volt signal onto the control wire connecting between the sender control unit and station 1 thereby causing the T relay at the station and panel control to close. As such, the t9 relay contact will change to the position not shown in FIG. 4, however, the D relay will remain energized for some time due to the time delay circuit which includes the resistor $R_{TD}$ and $C_{TD}$.

Upon completion of the circuits as described above, the station panel and control is conditioned at station 1 to continue the dispatching operation for the carrier loaded in the sender apparatus. In order to dispatch the carrier, however, the address selected on the dial buttons at the station must be interrogated to determine the destination of the carrier. This interrogation is conducted in the following manner.

At the same time that the OP relay energizes the P1 relay, the I relay in the time base is also energized. This circuit is connected in the following manner. When the OP relay becomes energized, the relay contacts op15 change to the position not shown in FIG. 6 to provide a ground connection through the relay contact rs9 to the I relay in the Time Base (TB). The other I relay coil lead is connected directly to the −48 volt supply thereby completing an electrical circuit through the I relay coil.

Simultaneously with energizing of the P1 relay, a connection is provided between the station panel and control of FIG. 4 to the Address Reader AR of FIG. 9. This connection is provided in the following way. The interrogate wire between the station and the sender control unit is connected by the p1 contact shown in FIG. 5 generally at 63 closes to provide an electrical connection via a common control wire to resistor R4 of the Address Reader AR (FIG. 9). The other lead of the resistor R4 is connected to either photosensor OE1 or OE2. Each photosensor OE1, OE2 in the preferred circuit comprises a Raysistor although other photosensors are acceptable. A Raysistor is a combination of a filament and photocell. The photocell becomes conductive when the filament reaches a predetermined level for light emission which is determined by the current flowing through the filament. Both of the photosensors are connected through relay contacts and a diode to pin 18 of the Time Base TB. This pin 18 is then connected by the closed relay contact i12 to relay contact c15. So long as relay contact c15 is closed thereby connecting to relay contact b12, a voltage will be applied at terminal 18 of the Time Base depending upon the setting of the relays A, B, and C. The setting of the A, B and C relays is determined in the following manner.

When the I relay is not energized, the i6 relay contact provides a ground connection to one of the A relay coil leads while the other relay coil lead is connected directly to −48 volts. As such, when the I relay is not energized, the A relay will be energized. Similarly, when the A relay is energized, the a15 relay contacts close thereby providing a ground connection to one of the B relay coil leads while the other lead is connected directly to −48 volts thereby causing relay B to be energized. When relay B is energized, relay contact b15 is closed to provide a ground connection through relay contact i9 of one of the C relay coil leads. The remaining C relay coil lead is connected to −48 volts thereby causing the C relay to be energized. Therefore, prior to energizing the I relay, relay A, B and C are all energized.

Additionally, relay D in FIG. 10 is also energized whenever the I relay is not energized. This energization of the D relay provided via the i15 relay contact which provides a ground connection to one of the D relay coil leads. The other D relay coil lead is connected to the −48 volt supply and, therefore, whenever the I relay is not energized, the D relay will be energized.

As shown in FIG. 10, each relay coil A, B, C and D is shunted by a series connected capacitor and resistor. These capacitors and resistors shunt each of these relay coils to thereby provide a time delay to prevent immediate opening of any of these relays upon removal of power supply voltage from the relay coils. The desirability of this feature will become more apparent from the following operational discussion of the address interrogation by the address reader of the destination address selecting apparatus at the station connected via the interrogate line.

Referring now to FIG. 13, a power supply 65 is provided with an alternating current output at a frequency of 60 Hz. This output signal is transmitted over the output line 66. A pair of Zener diodes shown generally at 67 are connected back-to-back and one of the Zener diodes is connected to the wire 66. The remaining free connection shown at 68 provides a signal relative to the ground which is a square wave having a frequency of 60 Hz and a magnitude varying between +12 and −12 volts if the Zener diodes 67 each have a 12 volt breakdown voltage.

A second set of back-to-back Zener diodes each with a breakdown voltage of 24 volts is shown at 70 and these diodes are connected in a similar manner to those shown generally at 67. The output signal appearing at the output terminal 71 is also a clipped sine wave which approximates a square wave having a frequency of 60 Hz and a magnitude varying between +24 and −24 volts. A third pair of back-to-back connected Zener diodes is shown generally at 72 and these diodes are connected between the wire 66 and ground. The breakdown voltage for these Zener diodes 72 is selected so the signal at terminal 73 is a clipped sine wave signal having a frequency of 60 Hz and a magnitude varying between +36 and −36 volts.

The nearly square wave signals developed by the circuitry shown in FIG. 13 are utilized by the time base to interrogate the address selected at the station by the station operator after he loads a carrier into the pneumatic dispatcher apparatus. The signals from terminals 68, 71 and 73 in FIG. 13 are applied to terminals 17, 16 and 19 respectively of the Time Base (TB) shown in FIG. 10.

When the I relay closes, a condition which has previously been discussed, the I12 relay contact in FIG. 10 will close. At this time, it will be recalled, relay coils A, B and C are conducting and, therefore, relay contact a12, b12, and c15 are all switched to the position not shown in FIG. 10. As such, the 24 volt peak-to-peak square wave signal from terminal 68 in FIG. 13 is connected via the a12 relay contact, the b12 relay contact, the c15 relay contact and the i12 relay contact to the Address Reader connector pin 18. Within the Address Reader, the positive pulses from the time base pass through CR5, the p1 relay contact, the light sensor OE1 and onto the resistor R4. On the other hand, the negative pulses from the Time Base pass through CR6, the relay contact p2, the light sensor OE2 and then to the resistor R4. As such, the Address Reader divides the positive and the negative pulses from the Time Base into two different paths thereby permitting sensing of the current for both positive and negative pulses for each magnitude of voltage appearing at pin 18 of the Address Reader.

Figure 14:
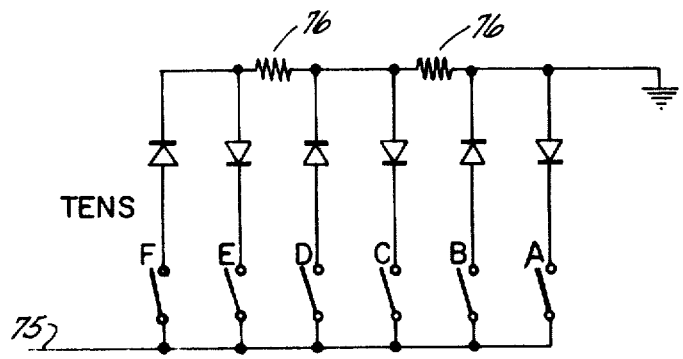
FIG. 14 shows the station address switches for the Tens address at each station.

The positive and negative pulses are again combined at point 74 and these pass on through resistor R4 to the SCU over the common control wire and through the p1 contact shown generally at 63 and to the station via the Interrogate wire. The signal then passes through the closed d10 relay contact to the t10 relay contact which is switched to the position not shown in FIG. 4. The signal is then transmitted to a series of diodes, resistors, and switches corresponding to the tens setting for the destination address selected by the operator at station 1. This combination of switches, diodes and resistors is shown in FIG. 14 and includes six switches labeled A, B, C, D, E and F. One of each of these switch contacts is connected directly to the lead 75 which is shown unconnected in FIG. 4. Each of the remaining switch contacts for switches A-F are connected to a diode arranged as shown in FIG. 14. The resistors 76 and 77 are connected in circuit as shown in FIG. 14 to provide discrimination between the different voltage signals appearing on line 75 while the diodes are provided to permit discrimination between the polarity of the signals provided on line 75.

Figure 15:
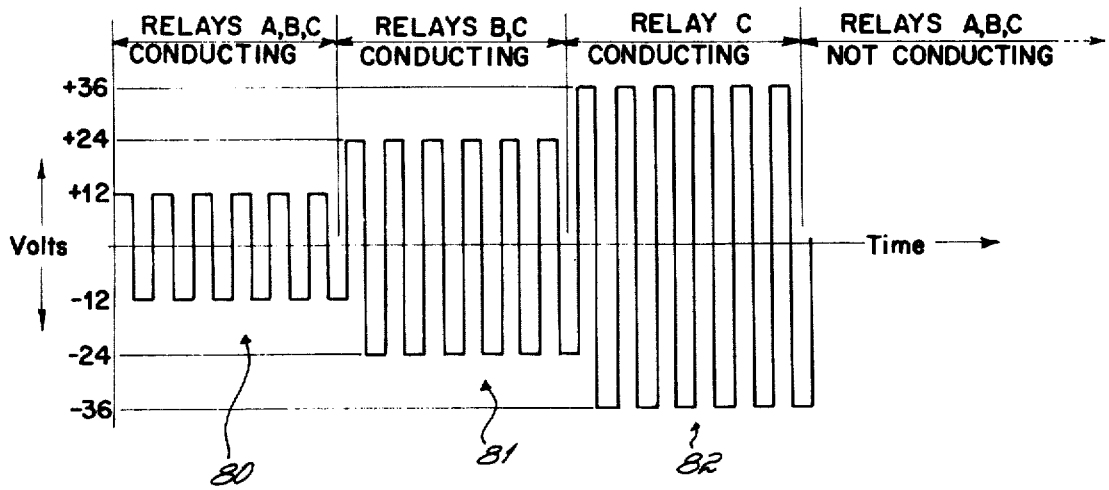
FIG. 15 shows the address switch interrogate signal as a function of time.

The actual signal appearing on line 75 is shown in FIG. 15. This signal is one which increases stepwise in time. That is, the a.c. signal during the first time period has a peak-to-peak amplitude of 24 volts for the preferred embodiment. At the end of the first time period, the peak-to-peak amplitude jumps stepwise to 48 volts. This 48 volt peak-to-peak signal continues for a second period of time after which the voltage again increases stepwise to 72 volts peak-to-peak. The signal shown in FIG. 15 corresponds to that generated by the preferred circuit of this invention. It will be recognized by those of skill in the art, however, that different voltage amplitudes might be selected by selecting different Zener diodes for the circuit in FIG. 13.

The first time period generally shown at 80, occurs when relays A, B, and C are energized and therefore, a +12 volt to −12 volt square wave signal is applied on line 75 through relay contacts a12, b12 and c15. During the second time period shown generally at 81, however, a square wave signal having a magnitude varying between +24 and −24 volts appears on line 75 through relay contacts a12, b12 and c15. This different signal is provided on line 75 because relay A, as shown in FIG. 10, stops conducting and the a12 contact changes to the position shown in FIG. 10. As such, the 24 volt square wave signal is applied through the address reader to the address switches at the station. In similar manner, as shown at 82 in FIG. 15, a 36 volt square wave signal is applied when relay B stops conducting.

Since the station operator has closed one of the destination selection switches A-F in FIG. 14 prior to depressing the send button, and since the t10 relay contact is changed from the position of FIG. 4 the signals transmitted over line 75 will pass through that selected single pole single throw switch A-F to a unidirectional current conducting element such as a diode. As such, only one polarity of signal on line 75 will pass through the diode to the ground connection. Therefore, only one polarity of pulse from the Time Base will conduct any significant amount of current to thereby activate only one of the photosensors OE1 or OE2 in the Address Reader. As an illustration, assume that the operator selected the D switch in FIG. 14, when the 12 volt signals, as shown generally at 80 in FIG. 15, are applied to line 75, only the positive going pulses of that signal will pass through the D switch, the connected diode, the resistor 77 to ground. The resistance of resistor 77 is selected so that the current passing therethrough at the 12 volt level of signal applied to line 75 is not sufficient to heat the filament of OE1 and, therefore, not affecting any changes in the resistance of the photocell. This will not activate the Q1 transistor which responds to the photosensor OE1 of the Address Reader.

When the signal shown at 81 in FIG. 15 becomes applied to line 75 of FIG. 14, however, the peak magnitude of the signal has increased to 24 volts. As such, the positive going pulses will pass through the closed switch D, through the diode, through the resistor 77 to ground. The current will be increased from that during the first time period shown generally at 80 and this current will be sufficient to be detected by the photosensor OE1 in the Address Reader if the value of resistor 77 is selected properly. This sensing will cause the transistor Q1 to conduct because the proper biasing signal will be applied to the base thereof because a predetermined current is passing through the photosensor to produce the required bias signal. Indeed, whenever a predetermined current passes through either OE1 or OE2, Q1 or Q2 respectively will be properly biased to conduct current.

When the P1 relay closes due to conduction of transistor of Q1, the interrogation path is disconnected because the p1 relay contact opens preventing the signals from the Time Base from passing through CR5. Additionally, a holding circuit is established for maintaining conduction through the P1 relay coil. This holding circuit extends from the P1 relay coil through the resistor R1, the diode CR1, the closed relay contact p1 to pin 8 of the Address Reader. The circuit continues through the Time Base pin 4, the closed contact d6 and through the closed contact i10 to ground.

At the same time, the s1 relay contact in FIG. 9 is energized because the S1 relay coil terminal 1 is connected to the ground potential at terminal E of the Address Reader via the a6 relay contact, the closed b6 relay contact and the closed c9 relay contact of the Time Base. This switching configuration of relay contacts a6, b6 and c9 occurs when the relays A, B and C of the time base are conditioned such that relay A is not conducting and relay B and C are conducting. As such, the S1 relay closes and the s1 relay contact shown generally at 83 to hold the S1 relay in a conductive state so long as a ground potential is connected to the point shown generally as 84.

By analyzing the Address Reader in FIG. 9, in a similar manner it can be shown that the R1 relay will become closed when the station switch B is closed rather than the D station switch. In a similar manner, the R2 relay will become energized when the A switch at the station is closed and the S2 relay will become energized when the C switch is closed. Further, when the E switch is closed at the station, only the P2 relay will be energized while when the F switch is closed at the station only the P1 relay is energized.

When the Time Base is complete, that is, when relays A, B and C have timed out and they are no longer energized, the relay contact c9 in FIG. 10 will close thereby connecting the ground potential at point 84 in FIG. 9 through the relay contact c9, the diode CR1, and u12 relay contact to the Address Reader pin J. According to the setting of the relays R1 and S1, the ground connection at pin J is connected either to coupler pin 1, 2 or 3. Coupler pin 1 will become connected to ground when the B station switch was detected as being closed. Coupler pin 2 will be connected to ground when the D station switch was detected as being closed. Coupler pin 3 will be connected to ground when the station switch F was detected as closed by the interrogation circuitry. As such, coupler relays AA, AB or AC in FIG. 8 will be energized by the ground signal being applied to the coupler pins 1, 2 or 3, respectively. For the example analyzed above, the R1 relay in FIG. 9 is not energized and the S1 relay is energized. As such, coupler pin 2 is connected to ground thereby activating relay AB. When relay AB closes, the contacts ab will also close thereby completing a second ground path for relay AB which passes from pin S of the coupler to pin 2 of the Time Base. From pin 2 the ground connection passes through the closed i15 relay contact to ground. As such, as long as the I relay or the P1 relay remain closed, the AB relay will be conducting.

In FIG. 10, when the C relay times out and ceases to be energized, the c6 relay contact switches to the position there shown to open circuit the D relay which has been connected to ground via the closed d12 relay contact. The D relay then begins to time out and approximately 80 milliseconds thereafter will open. When the D relay opens, the d6 relay contact shown in FIG. 10 opens, thereby removing the ground connection from point 84 in FIG. 9. It should be noted that CR1 in FIG. 10 prevents current flow through relay contact p19 of FIG. 9. As such, the holding path for relay P1 and S1 of the Time Base is removed. Additionally, since the A, B, and C relays of FIG. 10 are de-energized, no signals are applied to pin 18 of the address reader, thereby preventing the application of any signals to the photosensors OE1 or OE2. As such, the built-in time delay of OE1 will maintain conduction of transistor Q1 for some period of time which may or may not continue after the C relay stops conducting. In any event, the holding path for the P1 relay is removed and eventually the transistor Q1 will stop conducting to thereby assure that both the S1 and the P1 relays stop conducting.

When the A, B, C and D relays in FIG. 10 cease to be energized as either the P1 or P2 relays of FIG. 9 become deenergized, an energization circuit for the unit select relay is established. This energization circuit passes from ground to the p1 relay contact shown generally at 85 in FIG. 9 through the p2 relay contact shown generally at 86 in FIG. 9 to the d9 relay contact in FIG. 10 and through diode CR4 and the U relay coil to the −48 volt supply. As such, the U relay in FIG. 10 becomes energized. The significance of the U relay becoming energized is that a second and different type of interrogation is to occur and, specifically, the units destination switch at the station is to be interrogated.

When the U relay becomes energized, the u9 contact in FIG. 10 closes to thereby cause the A relay to close. Closure of the A relay causes the a15 relay contact to close to thereby energize the B relay. When the B relay becomes energized, the b15 relay contact closes to complete a circuit to ground through to the coupler pin U and the m1 relay contact shown in FIG. 8. Consequently, the C relay closes. Since the I relay is closed and the D relay is opened, the D relay has no way to become energized during this second interrogation cycle. It should be recognized, however, that as soon as the C relay becomes energized the A relay is disconnected because the c6 relay contact opens the energization circuit for relay A.

In addition, when the D relay becomes de-energized, the L1 and L2 relays in the coupler of FIG. 8 become energized through relay contact d15 of the Time Base in FIG. 10. When the L1 and L2 relays are energized, the M1 and M2 relays also become energized in the following manner. The L2 relay contact in FIG. 8 closes connecting one lead of the relays M1 and M2 to the −48 volt supply. The other lead of these relays M1 and M2 are connected to ground via a circuit completed through CR14, relay contact d12 and the energized relay contact c6 to ground. Consequently, the L1 and L2 relays become energized when the U relay is energized. The A, B and C relays become energized in sequence which then causes the M1 and M2 relays to also be engaged. When the C relay becomes energized, the A relay is disconnected to thereby start a new timing cycle for the time base.

It will be recalled that a negative signal was previously applied through relay contact d9 to energize the T relay at the station in FIG. 4. However, when the L1 relay becomes energized, a ground signal appears at pin 9 of the station panel and control in FIG. 4. This signal starts with the ground connection of the J relay in FIG. 7 which connects to the H pin of the coupler. Since the L1 relay is energized, the L1 relay contact connects the H pin to the J pin of the coupler. The ground then propagates through pin 4 of CCI through the de-energized position for relay contact c1 to pin 5 of CCI. When the ground contact is connected to pin 11 of CCII through the ab relay contacts to the Sender Control Unit pin 7. Since the P1 relay is still closed, the ground signal will be progagated to to pin 9 of the station panel and control shown in FIG. 4. When the ground signal appears at pin 9 of the station panel and control in FIG. 4, the T relay at the station is de-energized and the t10 relay contact switches to the position shown in FIG. 4 to permit interrogation of the units switches for the carrier destination selected at the station. The stepwise increasing in time interrogation signal received from the SCU will pass through one of the units switches 1–6 at the station panel and control and the interrogation proceeds in the same manner as indicated earlier for the tens switches. Since the U relay was activated, however, upon the previous timing out of the Time Base, the Address Reader will now cause either the H1, H2, K1 or K2 relays to be operated in response to the energization of the combinations of relays S1, T1, P1, P2, R2, and S2 during the interrogation of the unit switches at the station. For the particular circuit diagram shown in FIGS. 8, 9 and 10, when the station units switch 1 is closed, only the K1 relay will become energized in the coupler. Likewise, when the three units switch at the station is closed, the K2 relay will become energized at the end of the time base. When the 5 switch at the station is energized, both the K1 and K2 relays in the coupler will be energized at the end of the time base. In a similar manner, when the 2 switch is closed then the H1 relay becomes energized while when the 4 switch is closed the H2 becomes energized. On the other hand, when the 6 switch is closed, both the H1 and H2 relays become closed in the coupler.

Assuming that the interrogation cycle has been completed and one of the AA, AB, AC, AD, AE, AF, AG relays have been energized and also that at least one of the H1, H2, K1, or K2 relays have also been energized, then the destination station has been stored and the system is conditioned to activate the receiver selected by the operator at the sending station. Initially it will be assumed that either the AA, AB or AC have been energized. Since these relays are connected in series with relay coils BA, BB and BC respectively, these relays will also be energized. As such, either the relay contacts ba, bb, or bc are energized.

Assuming for the time being, that relay BA has been energized, correspondingly the relay contacts ba are also energized. As viewed in FIG. 8, pin 11 of the coupler is connected to a line labeled Code 1 which connects to the input of the receiver logic shown in the station and panel control of FIG. 4. Likewise, pin M of the coupler is connected to a line labeled Code 2 which also connects to the input of the receiver logic at the station of FIG. 4. The line labeled Code 1 actually connects to the receiver circuitry at three different station locations and the line labeled Code 2 connects to three other receiver stations in the preferred approach. The signals on either the Code 1 or Code 2 lines are detected by the receiver logic and only the addressed receiver responds. The manner in which the address receiver responds depends upon the code transmitted on either the Code 1 or Code 2 lines. At each receiver, however, there is circuitry similar to that shown in FIG. 12 which is wired to distinguish the signals applied to the Code 1 and Code 2 lines.

The actual signals applied to the Code 1 and Code 2 lines depend on the setting of the K1, K2, H1, and H2 relays. As viewed in FIG. 8, an alternating current signal is received from pin 3 of CCII through the closed m1 relay contacts to the common connection point shown generally at 90 with four diodes CR1, CR2, CR3, and CR4. If the K1 relay is energized, only the positive pulses of the alternating current signal applied at point 90 will pass through the diode CR1 to the Code 1 line. On the other hand, if relay K2 is closed, negative pulses of the AC signal will pass from point 90 to the Code 1 line. If both relay K1 and K2 are energized, then both positive and negative pulses of the signal applied at point 90 will also be applied on the Code 1 wire. Consequently, the receiver circuitry connected to the Code 1 wire must respond to a condition of positive pulses on the wire, negative pulses on the wire, or both positive and negative pulses on the wire. This can readily be accomplished by the circuitry shown in FIG. 12 by connecting the circuit in a manner well known to those of skill in the art.

A similar configuration exists for the Code 2 wire connected to pin M of the coupler. The code 2 wire, however, becomes activated only when one of either the H1 or H2 relays have been energized. As with the Code 1 wire, the Code 2 wire also will deliver three different signals, namely only positive pulses, only negative pulses or both positive and negative pulses on the Code 2 wire. As such, each of the Code 1 or Code 2 wires can be connected to three different and unique receiver stations thereby permitting the energization of the DA relay to permit the transmission of signals to six different receiver locations. Similarly, activation of the BB or BC relays each permit six possible receivers to be activated.

As indicated at the outset of this application, in one preferred embodiment of this invention, there are two different independent pneumatic loops each of which can operate separately. For the receivers actuated when either the BA, BB, BC relays have been actuated, these receivers are disposed along the pneumatic loop having receivers connected to, for example, loop one as shown in FIG. 8. When either the AD, AF or the AG relays become energized, these addresses correspond to receivers located on the second loop.

For the time being, however, we will consider only a single loop system. As shown in FIG. 12, the receiver circuitry can be connected to either the Code 1 or Code 2 wires by connecting pins 1 and 2 to pins 4–11 or pins 12 and 13 to pins 4–11 to descriminate between the three different possibilities of signals on each Code 1 or Code 2 line so that each receiver will respond to only one code applied on one of these lines. It is clear that minor modifications can be made to these circuits to increase the descrimination capability of the receivers to thereby increase the number of receivers connected to the Code 1 and Code 2 wires at any one time. At the selected receiver, however, a signal is developed at the base of the transistor shown generally at 91 to cause this transistor to conduct to thereby energize the receiver R relay. When the receiver R relay has been energized the deflection solenoid SW such as shown in FIG. 4, is connected through the receiver r relay contact to the central control P relay coil on FIG. 7 via a time delay TM1. The P relay has one relay coil terminal connected through the 1a relay contact to ground. When this connection is made, the P relay will become energized however, not a sufficient amount of current will pass through the deflection solenoid SW at the station to cause the solenoid to initially deflect.

When the P relay in CCII becomes energized, the beginning of a dispatch process occurs. A ground connection is established through the p relay contact (CCII) to the C relay coil shown in FIG. 6 (CCI) via the v relay contact. At the same time, the time delay TU associated the the V relay is actuated so that the V relay will close some time after the C relay has become energized.

When the C relay becomes energized, a short circuit via relay contact c9 (CCI) is provided around the P relay (CCII) and its associated time delay TM1. As such, a sufficient current will now flow through the deflector solenoid SW at the station to cause energization thereof. At the same time the switch contacts sw1 will change configuration to add a resistor in series with the deflector solenoid SW to thereby reduce the current passing therethrough. The changing of the relay contact sw1 at the receiver operates to put a ground potential on the Hold wire. This Hold wire from each receiver on the loop is connected to the answerback relay AB on CCII shown in FIG. 7. When the answerback relay AB energizes, the relay contacts ab will cause energization of the line answer relay LA. When the line answer relay LA becomes energized, the ground is removed from the set line to the receiving station to thereby remove power from the deflection solenoid, however, a ground potential is applied to the Hold wire through a low resistance Line Busy relay coil LB. This electrical path is established through the rs relay contact, the LB relay coil and, the ab relay contact to the Hold line.

When the answerback relay AB becomes energized, the ab relay contact connects the plus 12 volt supply through the j relay contact, the ab relay contact to pin 7 of the Sender Control Unit in FIG. 5. This positive signal is then connected via the closed relay contact p1 to the control wire connected to pin 9 at the station panel and control shown in FIG. 4. This positive signal will cause the C relay at the carrier sending station to become energized. When the C relay becomes energized at the station, the c relay contact closes thereby providing an electrical path between the −48 volt supply and ground to energize the H relay. This path includes a connection through an h relay contact a diode and the H relay coil. The actuation of the H relay is operative to turn on the slide gate motor indicated as SM. At the same time, another h relay contact is operative to turn on the Transit Light. In this configuration, the Transit Light will remain ignited as long as the H relay is energized and the slide motor SM will remain operative until either the H relay becomes de-energized or the F relay becomes energized.

When the slide gate comes to its fully opened position, the final contact fc becomes closed to thereby energize the F relay. When the F relay becomes energized, the f relay contact applies a ground signal to one terminal of the slide motor SM and the relay contact h applies a ground signal to the other motor terminal. Therefore, the slide motor SM is stopped in its fully opened position. It should also be realized that the G relay also becomes energized at the same time as the F relay and the g relay contact will close. This closure of the g relay contact, however, has no immediate effect because the H contact is closed. The purpose of the g relay contact however, is to de-energize relays F and G after the H relay has become de-energized. This de-energization will be described later.

When the slide gate opens, the carrier inserted at the sending station will be dispatched by the conventional pneumatic controls. Once dispatched, however, the slide gate must be returned to its closed position to permit subsequent insertion of another carrier at the station into the sender. This returning of the slide gate is performed in the following manner.

When the timer associated with the V relay times out, the V relay is energized. The time for the time delay of the V relay is controlled by the time delay unit TU and the resistors connected in parallel across this time delay unit. In the case of a short snorkel, the T relay in FIG. 6 has previously been energized and this will close the t relay contact to thereby connect R2 in parallel across the time delay unit TU. This will reduce the time delay before the V relay becomes energized. On the other hand, when a long snorkel is involved the T relay is not energized and the time delay before energization of relay V is increased. The time delay for the V relay is determined by the plug 59 shown in FIG. 5 which was described earlier in connection with the Sender Control Unit.

When the V relay becomes energized, the P1 relay in the Sender Control Unit of FIG. 5 is de-energized because the ground signal is removed from pin 8 of the SCU. This removal of the ground is caused by the opening of relay contact v12 in FIG. 6.

When the P1 relay becomes de-energized, the control and interrogate wires from the sending station are disconnected thus causing the C relay at the station of FIG. 4 to become de-energized. When the C relay becomes de-energized, power is disconnected from the H relay thereafter applying a power signal to the slide motor SM to reverse the motor and close the slide gate. When the slide gate reaches its fully closed position, the hc contact closes to the position shown in FIG. 4 to provide a ground signal through the g relay contact to cause the F relay to become de-energized which in turn de-energizes the G relay. When this occurs, the power signal is removed from the slide motor SM and the motor stops. In the Central Control I shown in FIG. 6, the OP relay will become de-energized when the V relay becomes energized. When this occurs, the op6 relay contact opens to thereby open the wind gate permitting the carrier to pass through the pneumatic loop in the manner well known in the prior art.

The remaining circuits are unaffected until the carrier arrives at the receiver. When the carrier arrives, it will activate the arrival switch RC shown in FIG. 4 and apply a ground signal through the relay contacts sw2 and over the Reset line to operate the RS relay at the Central Control II shown in FIG. 7. When the RS relay becomes energized, the rs relay contact maintains the LA relay in its energized state but it causes the LB and AB relays to be de-energized thereby removing the ground from the Hold wire and thus disconnecting the Reset relay RS. Once the reset RS de-energizes, then the line answer relay LA will also de-energize thereby resetting the circuit. It will be noted that when the OP relay becomes de-energized, the A, B, C and D relays of the time base become energized. It will also be recognized that when the OP relay becomes de-energized, the S relay in the Sender Control Unit in FIG. 5 will also cease conducting thereby providing a ground connection to activate the Z relay to its initial energized condition. Consequently, the foregoing description has completed the normal operation associated with the transfer of a carrier from one station to another where the two stations are located on the same pneumatic loop.

For the condition where the operator at the sending station dialed an address corresponding to a nonexistent receiver or an improperly operating receiver, the line answer relay LA in FIG. 7 will not be energized because the answer back relay AB will not be energized by a ground signal being placed on the Hold line from the receiver at the dialed station. When this occurs, the ground applied through the m relay contact in the coupler, the 1a relay contact in FIG. 7 through the time delay to the J relay will cause the J relay to be energized after the time delay times out. When the J relay becomes energized, a negative signal is applied on the Control Wire to the sending station to energize the T relay at the station shown in FIG. 4. Since this signal remains applied to the Control Wire, the D relay at the station will time out and become de-energized. When this occurs, the d9 and d10 contacts become open circuited to thereby disconnect the Control and Interrogate wires from the Sender Control Unit. The T relay, however, remains energized because a circuit is completed through the t9, the sender control door switch 51 through the door switch to the —48 volt supply. When the sender door is opened, however, the circuit is broken thereby causing the T relay to become de-energized. During the period when the T relay is energized and the D relay has timed out, the Reject light is illuminated to indicate to the operator that something has gone wrong with the receiver station dialed. The operator should then respond by opening the send door to turn off the Reject light. The J relay is de-energized when the D relay at the station becomes de-energized.

Referring now to FIG. 11, the Trunk Line Control logic (TLC) for controlling the pneumatic interconnection tube is shown with connections to portions of one control system associated, for example, with one pneumatic loop. The second pneumatic loop includes a similar trunk line control. There are a number of communication wires between the two trunk line controls to facilitate the transfer of a carrier from one loop to another, these intercommunication wires are shown generally at 100. As indicated in connection with FIG. 3, one capability of the present system is that two independent loops may be coupled together so that carriers may be transmitted from one loop to another through pneumatic interconnection tubes. The Trunk Line Control provides the logic to achieve this objective.

The logic shown in FIG. 11 functions in the following manner. Initially, it is assumed that a station on the A loop has signalled the central control that it desires to transmit a carrier from a station on the A loop to a receiver on the B loop. Under these circumstances, the interrogation of the address switches at the station on the A loop will cause energization of either the AD, AE or AF relays in the coupler of the control circuitry for loop A. This in turn will cause either ED, EE or EF relays respectively to be activated within the Trunk Line Control unit for loop A. When either the ED, EE or EF relays are energized, either of the ed, ee or ef relay contacts become closed and, therefore, the ES relay is energized within the TLC for loop A. Operation of the ES relay is operative to close the es relay contact thereby switching the signals from the Code 1 and Code 2 wires at the coupler in the A loop control to the common wires 101 and 102 for transmitting Code 1 and Code 2 line signals to the trunk line controller for the B loop.

At the same time that either the ED, EE or EF relays are energized, the ed1, ee1 or ef1 relay contacts are similarly switched from the de-energized position shown in FIG. 11. When this occurs, one of the (FA), (FB), or the (FC) relays in the trunk line control for loop B will be energized. Upon energizing either of these relays at the B loop trunk line control circuit, either of the fa, fb or fc relay contacts will close to thereby energize the ER relay in the B loop trunk line control (not shown). When this occurs, the ER relay contacts in the B loop control close to provide a ground connection to one contact for the T and C relays in the B loop trunk line control (also not shown but they are wired in the same manner as shown in the A loop TCU). The T and C relays within the B loop trunk line control perform the same function as the T and C relays in any station sender unit. In fact, the T and C relays in the trunk line control are connected to the sender control unit for loop B in a manner identical to that for a station and simulate at the central control for loop B a sender on loop B.

When the sender control unit for the B loop closes the P relay associated therewith, the ET relay in the trunk line control becomes energized. When the ET relay becomes energized, the TD relay is also energized to switch the common Code 1 and Code 2 wires 101 and 102 respectively onto the Code 1 and Code 2 wires in the B loop coupler. When this occurs, the AC signals generated at the A loop coupler are transmitted over these common wires 101 and 102 to the B loop Code 1 and Code 2 wires to address a receiver on the B loop. Additionally, it will be recognized that the et1 relay contact closure is operative to either the fa, fb or fc relay contacts within the B loop trunk line controller to actuate either the BA, BB or BC relays in the B loop coupler. This switching of the BA, BB or BC relay causes the common Code 1 and Code 2 wires within the B loop coupler to be connected to the communication lines connecting directly to the receiver units on the B loop. As such, the AC code from the A loop coupler is transmitted directly to the receiver communications lines connected to the B loop coupler.

Assuming that the addressed unit on the B loop does not exist or is not operational, the circuitry in the B loop will be operative to energize the T relay in the B loop trunk line control in the same manner as described earlier for energizing the T relay at a sender station when the dialed address does not exist. When the T relay in the trunk line control is energized, the (t) relay contact changes to connect a negative voltage through a thermistor, through the contact (t) to the wire 103 which connects the negative voltage through the de-energized er relay contact for loop A to the TT relay in the A loop trunk line control. For the present example, the TT relay shown generally at 104 will be energized within the A loop trunk line control when the thermistor in loop B trunk line control changes resistance sufficiently to permit energizing current to flow therethrough. When this occurs, the tt relay contact connects a ground connection directly to the J relay in the central control CCII for the A loop which will initiate at the A loop a reject in the same manner as described earlier for a single loop system.

In the case, however, where the receiver on the B loop is available to receive a carrier transmitted from the A loop, the sender control unit in the B loop will energize the C relay in the B loop trunk line control. When the B loop (c) relay contact closes, a signal is transmitted over line 103 to the A loop trunk line control to energize the CC relay which is operative to energize the trunk line deflector for deflecting a carrier from loop A onto the interconnection tube between loop A and loop B. This is achieved by closure of the cc relay contacts which is equivalent to an answerback from loop B to loop A. Closing the cc relay contact is operative to energize the deflector at the interconnection tube and actuate the pneumatic circuitry in loop A in a manner such that the interconnection tube appears to loop A to be identical to a receiver on loop A. As such, a dispatch will be produced within the loop A control logic to dispatch the carrier from the sending station on loop A to the interconnection tube.

The interconnection tube deflector will detect that the carrier has passed therethrough which cause a reset to occur at the loop A control logic by placing a ground signal on the Reset wire.

Arrival of the carrier at the station on loop B, on the other hand, actuates the reset procedures for loop B. This reset procedure will reset the controls for loop B and also de-energize the loop B trunk line control.

From the circuitry shown in FIG. 11, it is clear that the operation of the interconnection tube deflector to transmit a carrier from one loop to another simulates, to the sender loop, a condition which looks to the sender loop like a receiver on that loop and makes the interconnection tube look to the receiver loop control like a sender on the receiving loop. Consequently, the relatively complex problems of transmitting a carrier from one loop to another is greatly simplified by this design to a point where only nine wires are needed to interconnect the control logic associated with one loop to the control logic of the other loop.

Figure 17:
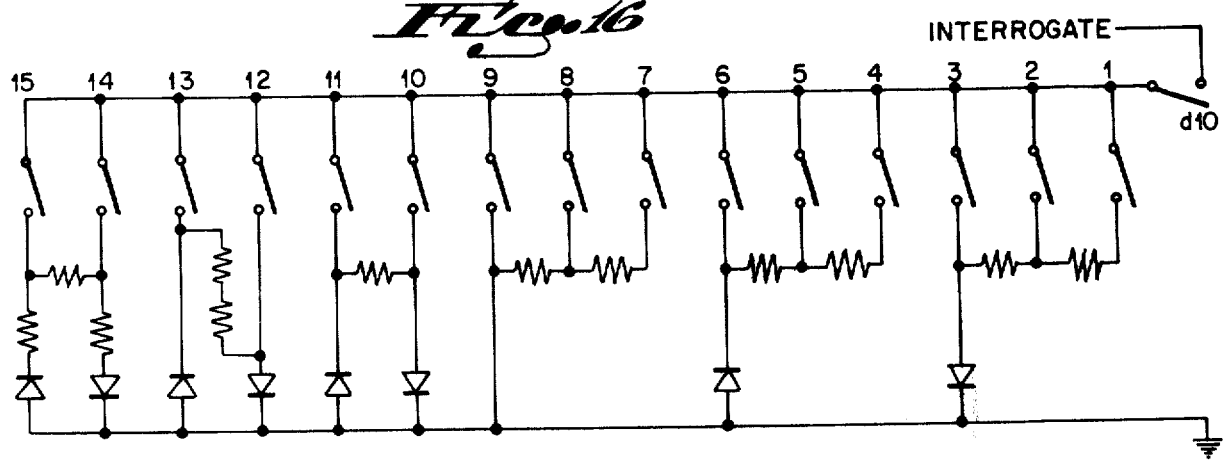
FIG. 17 shows a switching arrangement for a station selector switch which permits encoding 16 different destination addresses with a single set of 16 switches which are interrogated by signals transmitted over a single wire.

While the foregoing discussion has been made with particular emphasis on a preferred embodiment for this invention, it will be readily recognized by those of skill in the art that numerous modifications in form only may be made without departing from the spirit and scope of this invention. Particularly, the number of tens and units buttons on each station console may be expanded to thereby increase the number of stations which may be located on each loop. For example, switch connections may be provided at a station which will respond to the interrogate signal from the time base at a given voltage for both phases of the interrogate signal at a given voltage. This will conveniently make possible nine different switches at each station for the tens as well as nine different switches at each station for the units switches. An extended matrix can provide up to 15 active signals permitting an address capability of 16 numbers. Such an extended matrix is shown in FIG. 17. Additionally, further AC signals on the Code 1 and Code 2 lines must be generated from the coupler to uniquely address receiver locations. These new signals may be provided by having each receiver look at both the Code 1 and Code 2 wire and respond to a combination of signals on both wires. These modifications are easily made by skilled logic designers and need not be explained here in detail.

A similar modification might be to employ an interrogation signal with more different amplitudes than the three shown. Another approach might be to have an interrogation signal having a current which increases stepwise with time and to modify the sensor circuit in the address reader to respond to these different signals. Other forms of interrogation may also be used so long as the central control can determine from each station without requiring the station itself to send a signal to the central control containing the destination station information.

Another modification to the station logic is shown schematically in FIG. 4 within the dotted line 200. When this modification is incorporated, a significant saving of wire is achieved because a single common interrogate wire can be utilized which will connect each of the stations rather than, as discussed earlier, having a number of unique interrogate wires connected between the SCU and each of the stations. This modification is achieved in the following manner. The d10 relay contact as shown in FIG. 4 is removed and the th1 relay contact is substituted therefor. These connections are shown by dotted lines from the th1 relay contact shown within dotted line 200 to the connection point shown for the d10 relay contact. The TH relay becomes energized when a circuit is completed from the minus 48 volt supply through the t1 relay contact. It will be recalled that the T relay at the station becomes energized when a negative signal is applied on the control wire from the SCU to the particular station which indicates that the central control will shortly interrogate the destination switches at that station. As such, only one T relay at one station control will become energized. Consequently, only one TH relay will become energized when the corresponding t1 relay contact closes.

When the TH relay becomes energized, the th1 relay contact will close thereby connecting the t10 relay to the common interrogate wire. As such, the selection switches at the station panel selected by the central control will become connected to the common interrogate wire in a manner essentially identical to the description of system operation above.

When the TH relay becomes energized, the th2 relay contact also closes. The D relay at each station control is energized in the manner described above. This will cause the d1 relay within dotted line 200 to close. As such, the TH relay will be energized through two paths namely, the path through relay contact t1 or the path through relay contacts d1 and th2. Consequently, the TH relay will remain energized until the D relay and the T relay at the station control become de-energized.

Therefore, by adopting this modification as described above, a switching network is provided for uniquely connecting the circuits at only one station to a common interrogate wire in response to unique signals received from the SCU to the selected station. It will be readily recognized by those of skill in the art that this modification will significantly reduce the amount of wire needed to connect each of the stations to the interrogate circuitry at the central control because only one common interrogate wire is necessary.

The detailed description of the circuitry and its operation has been directed to a particular embodiment utilizing relays to perform switching operations within the control logic. It will be readily recognized by those of skill in the art that this relay logic may be replaced by digital transistorized logic or other forms of solid state circuitry while still preserving the functions of the circuitry described above. In addition to the foregoing changes, other changes in form only may be made of those of skill in the art without departing from the spirit and scope of this invention as defined in the following claims.

What is claimed is:

1. In a station-controlled pneumatic carrier system having at least two spaced-apart stations a control system comprising, in combination:
   a destination selector at each station, physically independent of a carrier, for selecting the destination for a carrier inserted into the pneumatic carrier system at the station;
   a central controller associated with at least said two stations for controlling the pneumatic carrier system;

signal means at each station for signalling said central controller when a carrier is ready to be sent from the station; and said central controller including an interrogation circuit for determining the destination station to which a carrier is to be sent pursuant to selection thereof by its associated destination selector, said interrogation circuit being operative to transmit to said associated station selector an interrogate signal and monitor the response thereto to thereby determine the identity of said destination station selected by said associated station selector, said central controller including a selector circuit for selectively connecting to said interrogation circuit only one station at a time in response to a signal from said signal means at a station.

2. The control system of claim 1 additionally including a receiving station activation means responsive to said interrogation circuit for conditioning for carrier receipt the destination station indicated by the destination selector of the station to which the interrogation circuit is connected by the selector circuit.

3. The control system of claim 2 additionally including dispatch means for transmitting the carrier from said connected station to the station indicated by the destination station selector at said connected station when said destination station has been conditioned for receipt of a carrier by said activation means.

4. A pneumatic system for transmitting carriers between remotely located stations comprising, in combination:

a first pneumatic loop with a plurality of stations disposed along the length of said first loop;

a second pneumatic loop with a plurality of stations disposed along the length of said second loop;

a pneumatic interconnection between said first and second loop permitting carriers to be transmitted from one loop to the other;

a first independent loop controller to control the pneumatic transfer of carriers between stations on said first loop;

a second independent loop controller to control pneumatic transfer of carriers between stations on said second loop;

interconnection controls in said first and second loop controllers for communicating between said controllers to control said first pneumatic loop, said second pneumatic loop and said interconnector to permit transfer of carriers from a station on one loop to a station on the other loop;

station selector means at each station to select the destination for carriers transmitted from the station; and an interrogation circuit at each controller for determining, from an interrogate signal transmitted to a station, the station selected on said station selector means at the station receiving said interrogate signal.

5. The pneumatic system of claim 4 wherein each controller includes a receiving station activator circuit to condition for receipt of a carrier the station determined by said interrogation circuit to receive a carrier.

6. The pneumatic system of claim 5 wherein each controller includes a sending station activator circuit to dispatch a carrier from a station after the desired destination station has been conditioned to receive a carrier.

7. A control system for a single loop station controlled pneumatic carrier system comprising, in combination.

a plurality of stations disposed around the pneumatic loop, each station including a destination address selecting means and a signalling means to signal that the station is conditioned to send a carrier;

a sender control unit;

a control wire uniquely associated with said said station for connecting said signalling means at the station with said sender control unit;

an interrogate wire for connecting said destination address selecting means with said sender control unit;

an address reader; and a common control wire connected at one end to said sender control unit and at its other end to said address reader;

said sender control unit being operative to connect the destination address means at only one station to said common control wire when said signalling means at said one station signals on said associated control wire that said one station is conditioned to send a carrier;

said address reader including an alternating current signal source connected to said common control wire, said alternating current source producing an output having an amplitude stepwise increasing with time and means to detect predetermined current levels for said alternating current signal, the setting of said destination address selection means at the station connected to said address reader by said sender control unit being operative to control the amplitude of said alternating current signal at which said predetermined current level occurs.

8. The control system for a single loop station-controlled pneumatic carrier system of claim 7 wherein each said destination address selecting means comprises, in combination:

a plurality of single pole, single throw electrical switches normally open-circuited, each said electrical switch including two switch contacts, one of said switch contacts being connected to said interrogate wire;

said plurality of electrical switches including a pair of electrical switches each having its other contact wired to ground through a unidirectional current conducting element, the direction of current flow permitted from said interrogate wire through said pair of electrical switches being opposite in direction due to opposite arrangement of said unidirectional current conducting elements;

said plurality of electrical switches including other pairs of electrical switches each having its other contact wired to a unidirectional current conducting element arranged to permit different direction of current flow through each electrical switch in each said other pair, the other lead of each unidirection current conducting element associated with a given other pair of electrical switches being connected to ground through a resistance path, the resistance path associated with each other pair of switches having a different electrical resistance from other said resistance paths.

9. The control system for a single loop station-controlled pneumatic carrier system of claim 8 wherein said destination address selecting means comprises in combination an additional address selecting means as defined in claim 2 and an additional switch means controllable from the sender control unit to select which destination address selecting means is connected to said interrogate wire.

10. The control system for a single loop station-controlled pneumatic carrier system of claim 7 wherein said alternating current source for producing a signal with an amplitude stepwise increasing with time comprises:
  an alternating current source;
  a plurality of signal clipping elements for clipping the signal from said alternating current source to form a plurality of square wave signals with different amplitudes;
and
  a time base selector for connecting the outputs of each signal clipping element to said alternating current source output in sequence to provide said alternating current signal with an amplitude stepwise increasing with time.

11. The control system for a single loop station-controlled pneumatic carrier system of claim 10 wherein each said signal clipping element comprises a pair of back-to-back connected Zener diodes with one lead of said connected pair of Zener diodes being connected to said alternating current source and the other lead providing one said square wave signal.

12. The control system for a single loop station-controlled pneumatic carrier system of claim 7 wherein said predetermined current level detector comprises, in combination:
  a positive pulse current monitor and a negative pulse current monitor; and
  a current level switch responsive to each current level monitor, each said current level switch being activated when the connected current monitor detects a predetermined current.

13. The control system for a single loop station-controlled pneumatic carrier system of claim 12 wherein each said current monitor comprises a photosensor.

14. The control system for a single loop station-controlled pneumatic carrier system of claim 13 wherein each said current level switch comprises a Schmitt trigger circuit responsive to one said photosensor.

15. The control system for a single loop station-controlled pneumatic carrier system of claim 7 additionally including a destination address storage means responsive to said address reader for storing the address read from the station destination address selecting means by said address reader.

16. The control system for a single loop station-controlled pneumatic carrier system of claim 15 including a destination station selector responsive to said destination address storage means for conditioning the destination station defined by the destination address to receive a pneumatic carrier from the pneumatic loop.

17. The control system for a single loop station-controlled pneumatic carrier system of claim 7 wherein said destination address selection means at each station includes a group selection means and a unit selection means, said group selector for selecting the group in which the destination is located and said unit selector for selecting the unit within the selected group.

18. The control system for a single loop station-controlled pneumatic carrier system of claim 17 additionally including a destination address storage means responsive to the address reader for storing the group number and the unit number read from the destination address selector means by the address reader.

19. The control system for a single loop station-controlled pneumatic carrier system of claim 18 including a destination station selector responsive to said destination address storage means for conditioning the destination station defined by the destination address to receive a pneumatic carrier from the pneumatic loop.

20. The control system for a single loop station-controlled pneumatic carrier system of claim 19 wherein said destination station selector includes a pair of code wires connected to each station in each group, a code generator responsive to the unit number stored in said storage means and a selector switch responsive to group number stored in said storage means to connect said code generator to the pair of code wires corresponding to the group numbers stored in said storage means.

21. The control system for a single loop station-controlled pneumatic carrier system of claim 20 wherein each station in a group of stations includes a receiver responsive to said pair of code wires to energize the receiver station upon recognizing a unique code on said pair of code wires.

22. The control system of claim 19 additionally including
  a second control system like that defined by claim 13 for controlling a second pneumatic loop, the group numbers associated with stations on one pneumatic loop being different from the group number for stations on the second pneumatic loop;
  a loop interconnector circuit for transmitting the unit number from the storage means of one loop to the pair of code wires at the other loop having a group number corresponding to the group number stored in the storage means for said one loop.

* * * * *